(12) United States Patent
Klann

(10) Patent No.: US 6,478,314 B1
(45) Date of Patent: Nov. 12, 2002

(54) WALKING DEVICE

(76) Inventor: Joseph C. Klann, 68010 U.S. Hwy. 71, Morton, MN (US) 56270

( * ) Notice: Subject to any disclaimer, the term of this patent is extended or adjusted under 35 U.S.C. 154(b) by 0 days.

(21) Appl. No.: 10/113,334

(22) Filed: Mar. 29, 2002

Related U.S. Application Data

(63) Continuation-in-part of application No. 09/245,804, filed on Feb. 5, 1999, now Pat. No. 6,260,862.
(60) Provisional application No. 60/074,425, filed on Feb. 11, 1998.

(51) Int. Cl.[7] ............................................. B62D 57/02
(52) U.S. Cl. .......................... 280/28.5; 180/8.1; 180/8.5
(58) Field of Search ........................... 180/8.1, 8.2, 8.3, 180/8.4, 8.5, 8.6, 8.7; 280/28.5; 446/353, 355, 356; 901/1

(56) References Cited

U.S. PATENT DOCUMENTS

| | | | | |
|---|---|---|---|---|
| 61,416 A | * | 1/1867 | Goodwin | 446/356 |
| 1,567,684 A | * | 12/1925 | Srakula | 180/8.3 |
| 1,576,956 A | * | 3/1926 | Dunshee | 446/356 |
| 1,638,332 A | * | 8/1927 | Gobbato | 446/356 |
| 1,691,233 A | * | 11/1928 | Ehrlich | 180/8.3 |
| 1,807,391 A | * | 5/1931 | Danko et al. | 446/338 |
| 2,941,481 A | * | 6/1960 | Philbrick | 180/8.4 |
| 3,178,853 A | * | 4/1965 | Greenwood et al. | 446/356 |
| 3,559,336 A | * | 2/1971 | Nozaki | 446/300 |
| 3,678,617 A | * | 7/1972 | Nomura | 446/356 |
| 4,095,661 A | * | 6/1978 | Sturges | 180/8.6 |
| 4,502,556 A | * | 3/1985 | Bartholet | 180/8.6 |
| 4,503,924 A | * | 3/1985 | Bartholet et al. | 180/8.6 |
| 4,511,011 A | * | 4/1985 | Bartholet | 180/8.6 |
| 4,527,650 A | * | 7/1985 | Bartholet | 180/8.6 |
| 4,919,492 A | * | 4/1990 | Samuelson et al. | 303/15 |
| 5,423,708 A | * | 6/1995 | Allen | 180/8.6 |
| 5,758,734 A | * | 6/1998 | Hong et al. | 180/8.1 |

* cited by examiner

Primary Examiner—Paul N. Dickson
Assistant Examiner—Ruth Ilan
(74) Attorney, Agent, or Firm—M. Paul Hendrickson

(57) ABSTRACT

The present invention provides a means for limiting the hip and elbow movement in a reciprocating leg so as to simulate the gait of a walking animal. This is accomplished through the use of one or more arcuate guides which control the hip and elbow movement of the reciprocating leg.

12 Claims, 28 Drawing Sheets

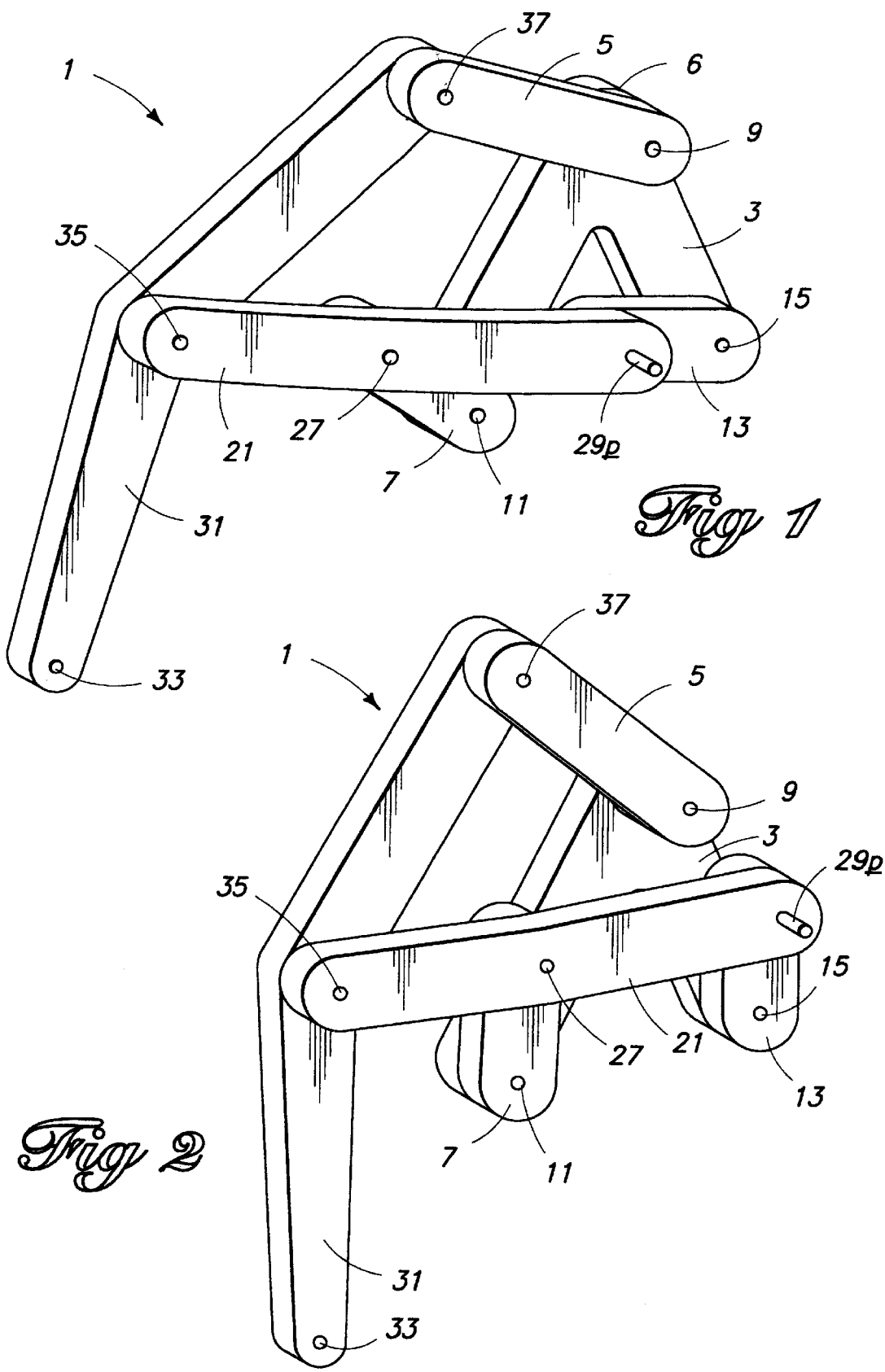

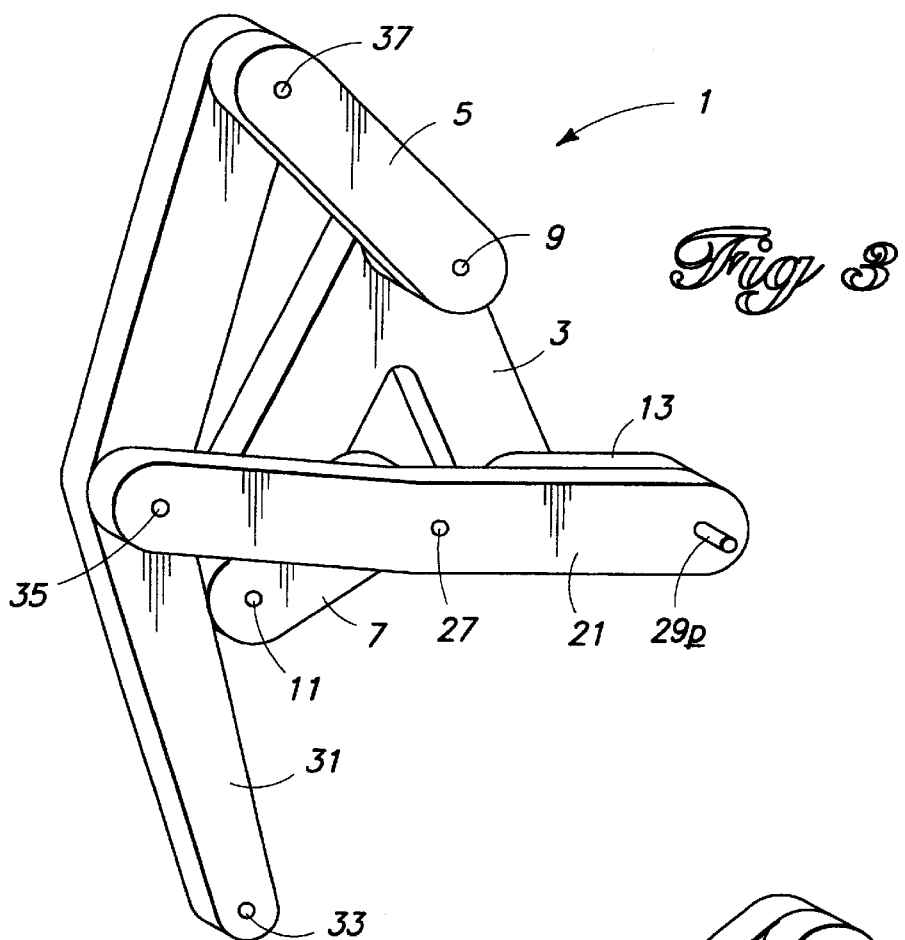
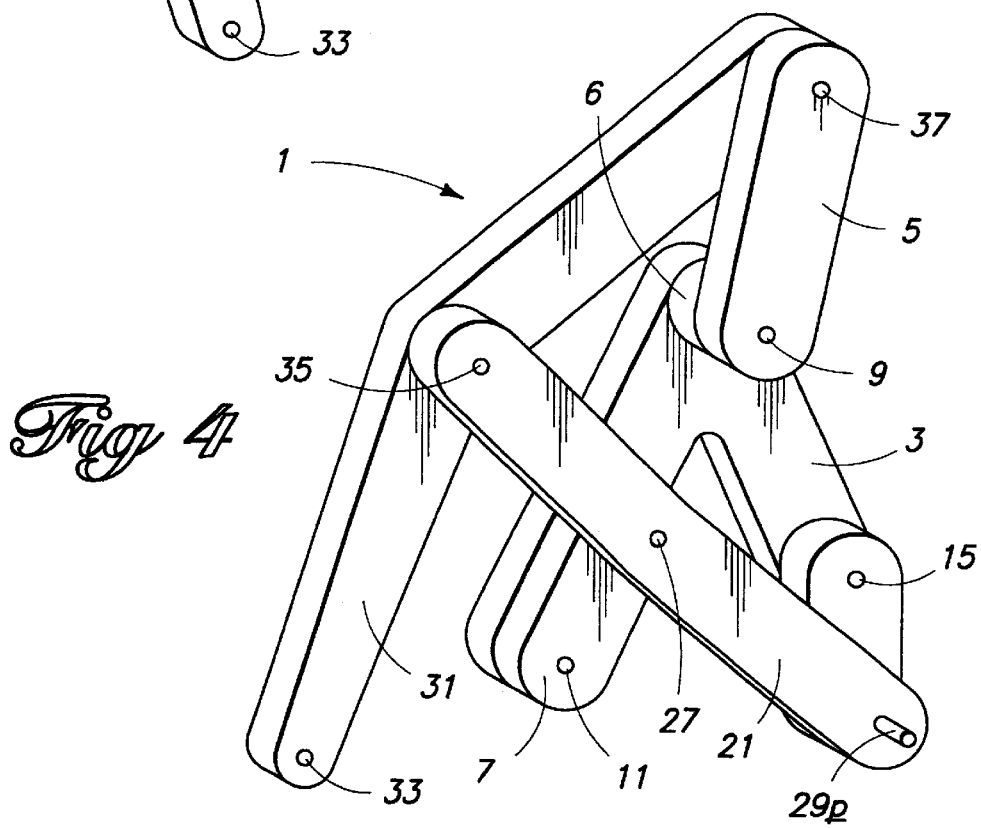

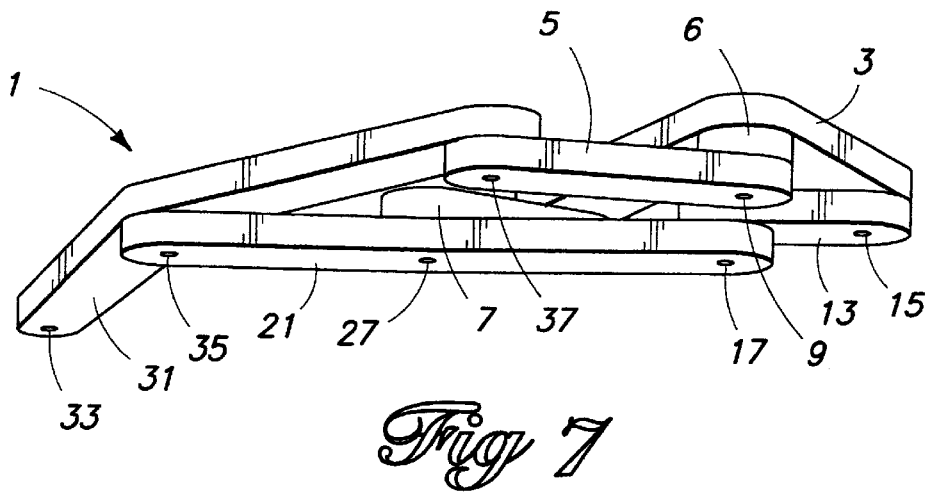
Fig 7
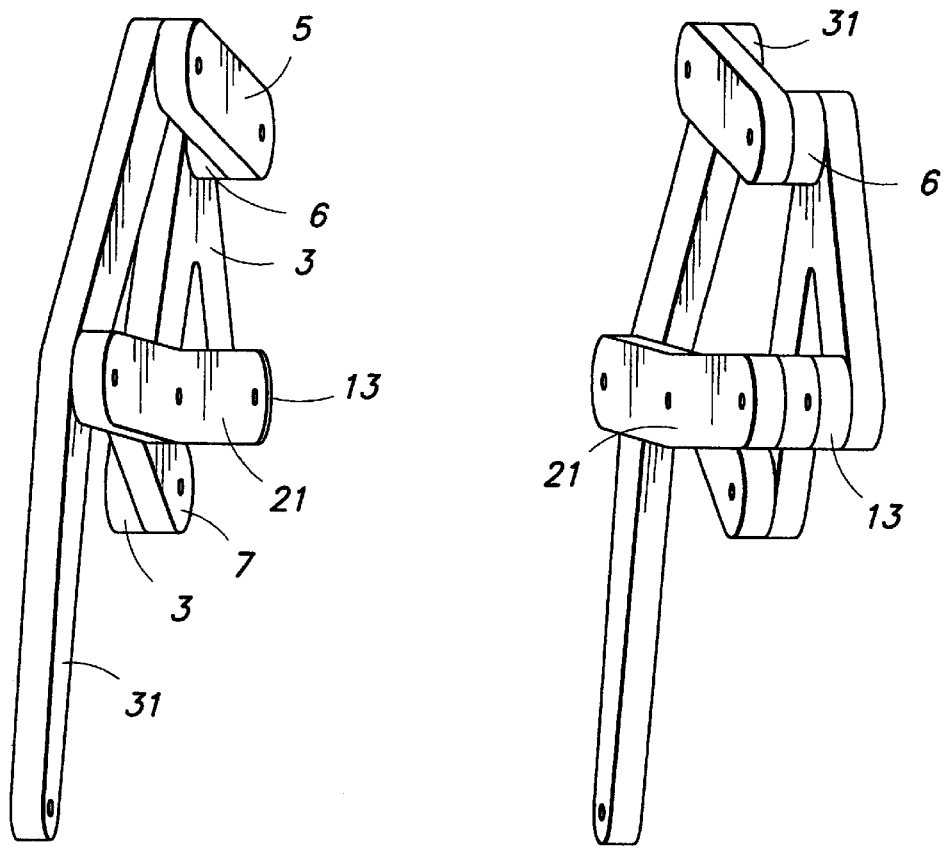
Fig 8                    Fig 9

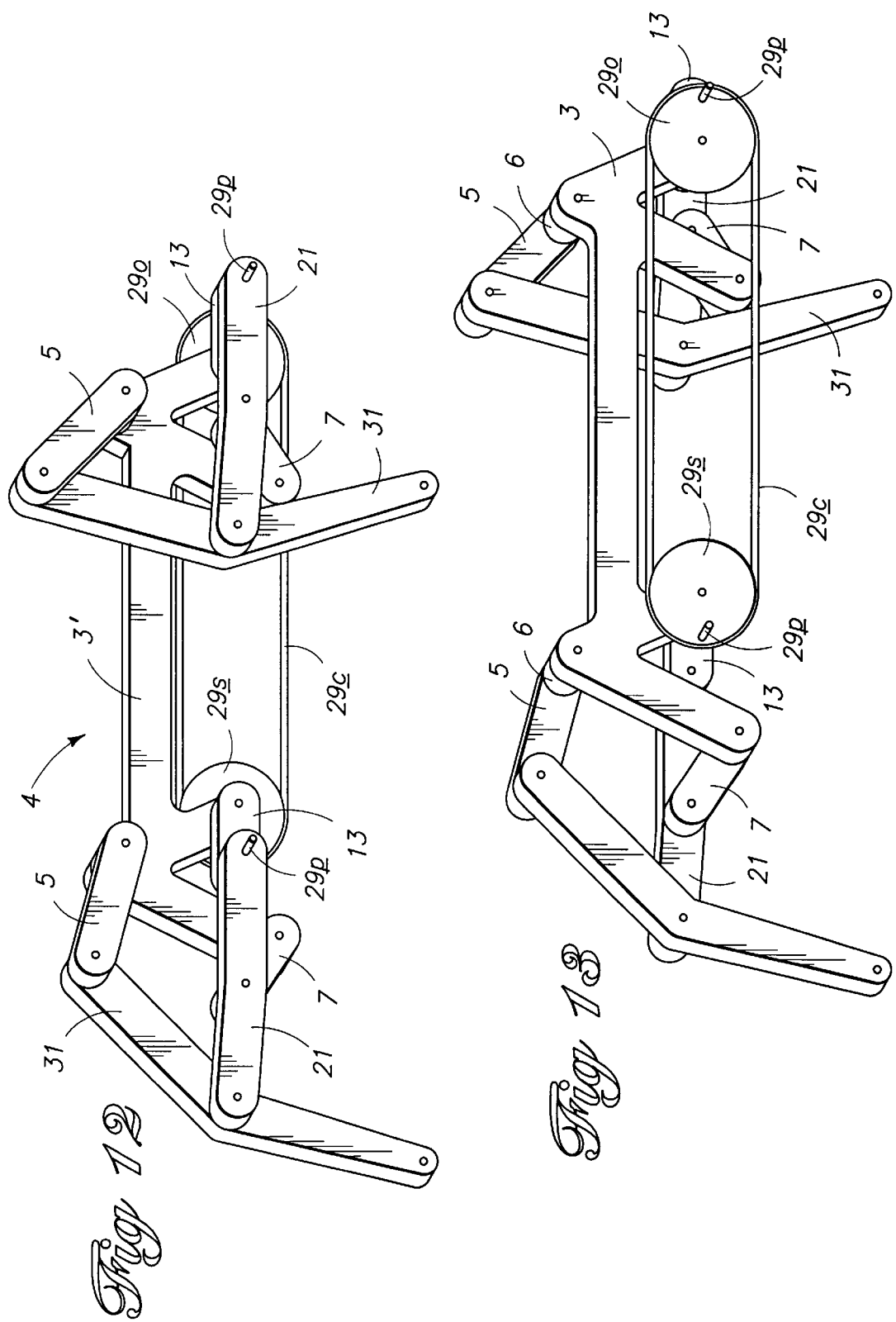

WALKING DEVICE

This application is a continuation in part of U.S. patent application Ser. No. 09/245,804 filed on Feb. 5, 1999, now U.S. Pat. No. 6,260,862, which claims benefit of U.S. Provisional Application Ser. No. 60/074,425, filed on Feb. 11, 1998, all having the same inventor and title as this Application.

FIELD OF THE INVENTION

The present invention relates to a walking device and its use and more particularly to a walking device which simulates a walking or running gait of a legged animal.

BACKGROUND OF THE INVENTION

It is difficult and often impossible to traverse certain surfaces with wheeled devices. Certain surfaces, such as slippery, sandy, iced, muddy, snowed, etc. surfaces, often result in complete immobilization of the wheeled device. Other difficult to traverse surfaces, such as stepped, obstructed, uneven, etc. surfaces, frequently create insurmountable barriers for wheeled devices. It would be desirable to provide a walking device which would simulate the walking gait of an animal so as to overcome these shortcomings of wheeled devices.

SUMMARY OF THE INVENTION

The present invention provides a walking device which simulates a walking step or gait of an animal. The device comprises pivotal linking sites and linkages which actuate a walking gait. The walking device includes a frame which supports a walking assembly composed of a cooperative arrangement of linkages axially connected together so as to provide a walking assembly which simulates the walking gait of an animal. The linkages are appropriately linked together by axial linking means for axially connecting the linkages together and to the frame. The linkages include a pair of rocker arms (upper and lower) axially mounted to a frame, a connecting arm or rod, a reciprocating leg and a cranking link. The pair of rocker arms includes a first rocker arm (upper) and a second rocker arm (lower) respectively axially anchored at one of their respective rocker arm ends to the frame and to different linkages at an opposite rocker arm end. The cranking link is also axially mounted to the frame in operative association with a power source and operatively linked to at least one connecting rod so as to provide locomotion to the interconnected linkages of the walking assembly. The walking assembly includes a reciprocating leg equipped at one leg end with a foot and a hip joint at an opposite leg end. The hip joint is axially coupled to an opposite rocker arm end from the axial mount of one rocker arm end to the frame. The first rocker arm limits locomotion of the hip joint about an acute arcual path as the first rocker arm and tipper extremity of the leg reciprocates about the path when placed under locomotion by the power source.

A connecting rod powered by the cranking link connected to a suitable power source at a power end of the connecting rod and axially connected at a drive end of the rod to a knee joint centrally disposed between the hip joint and foot of the leg serves as a drive train for transferring the revolutionary motion of the cranking link to a reciprocating motion for powering the leg. The connecting rod includes an elbow joint connecting site axially linked to the second rocker arm which, similar to the first rocker arm, is also axially anchored at an opposite rod end to the frame.

The second rocker arm serves to limit the reciprocating motion of the elbow joint of the reciprocating arm as well as the knee joint of the leg. In operation, the first rocker arm and the second rocker arm cooperatively serve to limit the gait to a reciprocating arcual motion.

The cranking link includes a crank shaft powered by a suitable power source and a crank pin operatively connected to the connecting rod. Locomotion to the walking assembly is generated by any suitable power source powering the crank which, in turn, drives connecting rod. The crank shaft powered by a manual or motorized power source supplies rotational motion to the crank pin which transfers the orbital motion to the reciprocating motion of the connecting rod. Each revolution of the crank pin simulates a complete step. Thus, for each revolution of the crank pin, the reciprocating connecting rod as well as the leg will complete one reciprocating cycle (i.e. a complete forward and a complete rearward reciprocating motion).

The pivotal joints linking the linkages (i.e. the leg, the rocker arm, the connecting rod and cranking linkage) together and to the frame may be comprised of any suitable connecting link at the linkages which permit the linkages to revolve about the connecting links, such as a rod, pin, spindle shaft, axle or any other orbital connecting means which permit the linkages to revolve about their respective connective joints or links. Three of the linkages, namely the two rocker arms and the crank, are connectively linked to the frame while the remaining linkages are interconnected together. The first and second rocker arms rotate about connective axle sites attached to the frame which serve to generally limit the reciprocating motion of the connecting rod and the leg to arcual path. The frame provides the supportive structure for the linkages while also permitting a plurality of legged assemblies to be mounted to a single frame.

The rocker arms serve to limit the legged motion to a reciprocating arcual movement by limiting the horizontal and vertical motion of the reciprocating leg. Thus, when power is supplied to the crank, the connecting rod rotates about the crank link (pin)causing the rod to move the leg upwardly and downwardly through an arcual path for 180° (similar to a foot lifting gait) followed by a substantially horizontal backward motion to the 360° position at which time the sequence again repeats itself Multiple walking assemblies, each of which simulate a single leg of an animal, may be mounted to the frame so as to create a walking or running gait. In a walking device for simulating the walking gait of an animal, three or more legs may be effectively utilized to stabilize the device against tipping.

BRIEF DESCRIPTION OF THE DRAWINGS

FIG. 1 depicts a side elevational view of a single legged walking device of this invention, the leg depicted in the grounded, fully extended grounded stride position.

FIG. 2 depicts the walking device shown in FIG. 1 with the leg shown in an intermediate grounded stride position.

FIG. 3 shows a side elevational view of the device shown in FIG. 1 depicting the grounded leg at the end of the grounded gait position.

FIG. 4 is a side elevational view of the legged walking device shown in FIG. 1 with the leg being depicted in an elevated position.

FIG. 7 is a top elevational view of FIG. 1.

FIG. 8 is a side frontal view of FIG. 1.

FIG. 9 is a rear side elevational view of the device shown in FIG. 1.

FIG. 12 depicts a side elevational view of a double legged tandem walking device powered by a chain with synchronized legs being shown as connected in a tandem relationship to a common frame.

FIG. 13 is an opposite side elevational view of FIG. 12.

DETAILED DESCRIPTION OF THE INVENTION

Figure 5:
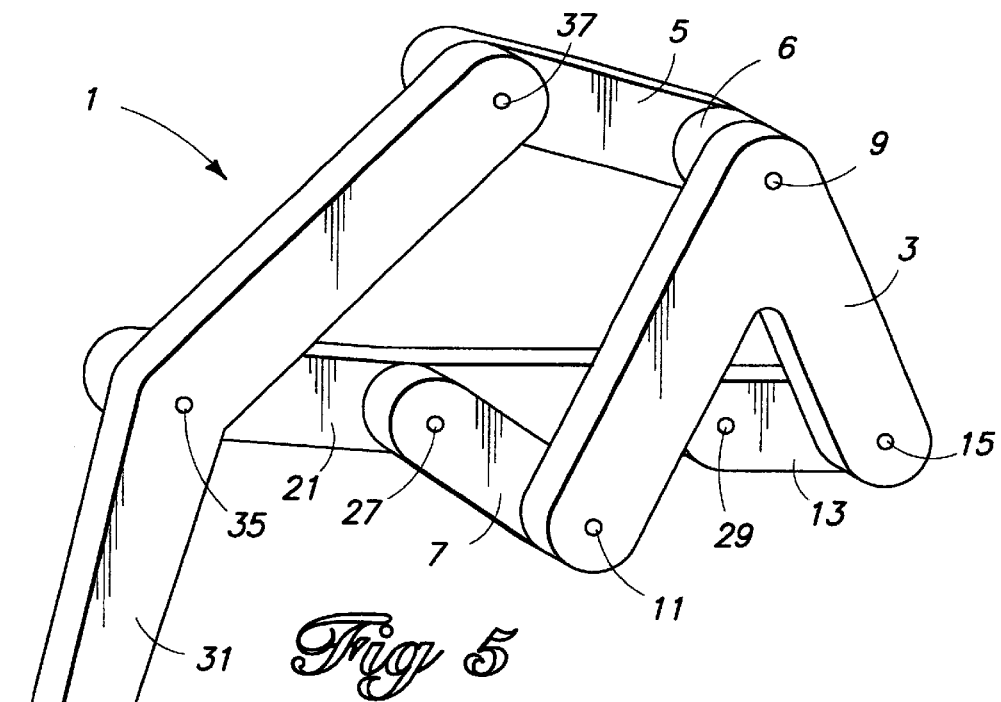
FIG. 5 depicts an opposite side elevational view of the device shown in FIG. 1.

With reference to FIGS. 1–19, there is provided a walking device (generally referenced by an enumeration 1 and suffixed for illustrative purposes) for simulating a walking step of an animal, said device 1 comprising a supportive frame (3), a reciprocating leg (generally referenced as 31) having a foot (referenced by 33) at one leg end, a hip joint 37 at an opposite leg end from said foot 33 and a centrally disposed knee joint (generally referenced by 35) a first rocker arm 5 axially connected at one rocker arm end to the hip joint 37 and axially anchored to the frame 3 by first rocker arm axle 9 at an opposite rocker arm end, a connecting rod 21 equipped with a knee coupling mount 35c at a distal connecting rod end for operationally connecting connecting rod 21 (also referred to as a connecting arm) to the knee joint 35, a crank mount 17c at a proximate end of the connecting rod 21 and an elbow joint connecting site 27 laterally positioned between said knee coupling mount connecting rod $35_c$ and said crank connecting rod mount $17_c$, a second rocker arm 7 axially coupled to the elbow joint 27 at a first end of the second rocker arm 7 and axially mounted to frame 3 by a second rocker arm axle 11 at a second rocker arm end, and a crank 13 axially mounted to the frame 3 by crank shaft 15 which, in turn, is operatively connected to locomoting means (generally referenced as 29) for powering crank 13. A crank pin 17 of crank 13 is axially connected to connecting rod mount $17_c$ at a distal connecting rod end or power input end of connecting rod 21.

Figure 10:
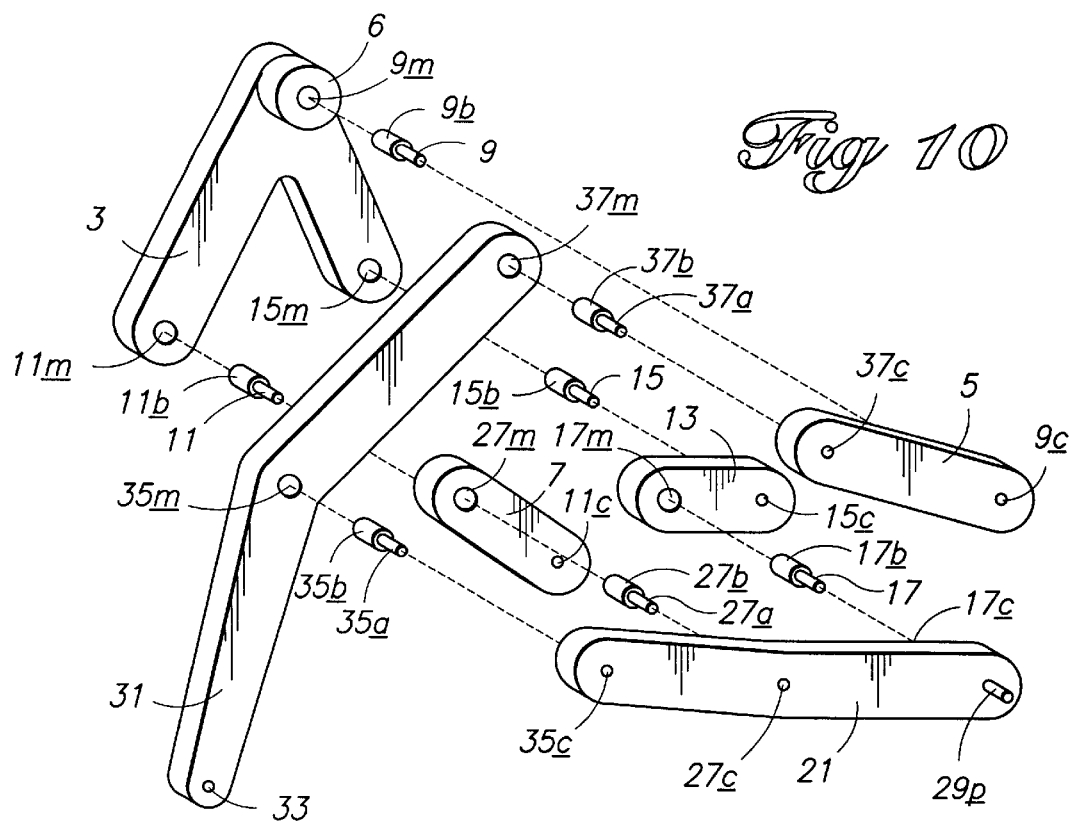
FIG. 10 is an exploded view of the components for the device shown above.

The walking device 1 may be perceived as comprising one or more basic structural units, the basic walking assembly 1 of which comprises a single legged device 1 (or as 1 suffixed by alphabetical letter for illustrative purposes) as depicted in FIGS. 1–10. By combining the basic walking assembly units together (e.g. $1_A$, $1_B$ and $1_C$), multiple legged walking devices+(4,8,8',10) as illustrated in FIGS. 11–16 and 18–19 may be created. The number of basic units 1 linked together to form the desired walking device is unlimited. As may be observed from the basic walking unit 1 shown in FIGS. 1–10, the basic walking assembly 1 of the walking device is equipped with two rocker arm linkages (5 and 7) each of which is axially mounted to frame 3 at axle mounts 9 and 11. Crank 13 is also axially mounted to the frame 3 by crank shaft or axle 15 which, in turn, is connected to a suitable power source (manual or powered) for powering crank pin or spindle 17 positioned in a laterally disposed relationship to the crank axle 15. The distance knee joint 35 travels will depend upon the distance traversed by connecting rod 21 which, in turn, depends upon the orbital path of crank pin or rod 17. Referring to FIG. 10, crank pin 17 is operatively connected to the connecting mount $17_c$ of connecting rod 21 at a proximate connecting rod end or power end. Knee axle $35_a$ is axially connected at a distal connecting rod end of connecting rod 21 to a knee joint 35. Second rocker arm 7 reciprocates about an acute angular arc vortexed at its axle mount 11 to frame 3, while the connecting rod 21 reciprocates in a backward and forward motion when the crank connecting link $17_c$ of the connecting rod 21 is drawn about an orbital path of crank pin 17 of crank 13.

The first rocker arm 5 is connected to frame 3 by first rocker arm axle 9 which, in turn, maintains hip joint 37 along an arcual path of an acute angular configuration causing the hip joint 37 to be withdrawn in an upwardly direction, and upon completion of the backward motion of leg 31 to be thrust in a downwardly and outwardly motion so that leg 31 thereby simulates a walking gait as the first rocker arm 5 reciprocates in its radial backward and forward motion. These gaited movements follow a sequential radial pattern which bear a corresponding registration onto the orbital position of the crank spindle 17 at any given time. For any given angular position of spindle 17, foot 33 will, accordingly, bear a constant registration along a curvilinear and linear pathway as formed by moving foot 33.

Movement of the various linkages about their respective axial connecting links may be observed by referring in particular to FIGS. 1–9. FIGS. 1 and 5 depict side elevational views of a single legged walking device 1 in which leg 31 is shown as being fully extended in the grounded position. It will be observed that crank 13 and connecting rod 21 both register in a fully extended positioning as is leg 31. If crank rod or crank spindle 17 is prescribed a 0° reading when the leg 31 is in the fully extended position as shown in FIGS. 1 and 5, then various other positions of the gait may also be referred by the radial positioning of crank rod 17. As previously mentioned, at any radial position of crank rod 17 the walking device 1 will exhibit a given configuration. Thus, the configuration of the various components of the walking assembly 1 will undergo cycled transformation in configuration as the crank rod 17 rotates about its orbital axis until the crank rod 17 completes its orbital 360° axis, at which time a repetitive sequence of cycling and configuration will then repeat itself. Thus, for any given radial position of crank spindle or rod 17, the walking assembly 1 will have a prescribed configuration and relationship between its component linkages.

Figure 6:
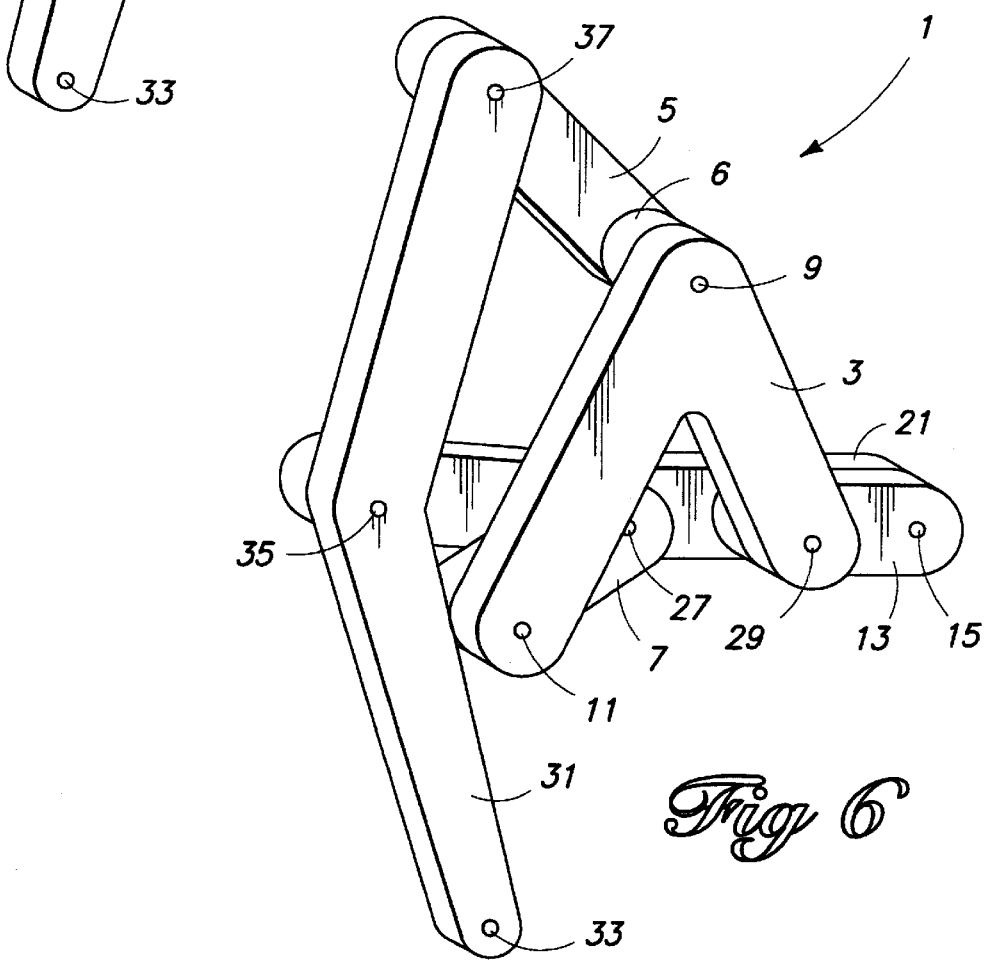
FIG. 6 is an opposite side elevated view of FIG. 3.

The various cycled steps of the walking device 1 as exemplified by a single legged device 1 may be viewed by referring to FIGS. 1–9. As may be seen in FIGS. 1 and 5, the leg is fully extended when crank spindle 17 is at 0°. In FIG. 2, crank rod 17 is shown as being rotated to a 90° radial position whereupon leg 31 and foot 33 moves to an intermediate grounded stride position. As crank rod 17 rotates to the 180° position (as shown in FIGS. 3 and 6), the grounded leg 31 is then shown at a completion of its grounded gait position. This would represent a leg 31 in its most rearward grounded position immediately before foot 33 is lifted from the ground by crank 13. As the crank rod 17 of crank 13 rotates clockwise from the 180° position, foot 33 is lifted from the surface by the arcual movement of leg 31 until rod 17 rotates past a 270° angular position, whereupon leg 31 and foot 33 express their most elevated lifted position (at about 285°) or orbital position. FIG. 5 depicts an opposite side view of the walking assembly 1 shown in FIG. 1 in which the crank rod 17 has returned to its original 0° position. Further rotation of the device will result in a repetitive recreation of the cyclic configurations of an orbital movement of the foot 33 as partially depicted by FIGS. 1–9. The manner in which the linkages control the gait is uniquely different from conventional means used to propel surface vehicles. When first implanting foot 33, the interconnected linkages allow foot 33 to follow a substantially linear movement until it reaches it most rearward position at which time the linkages lift the foot 33 so it may then traverse impeding objects such as steps. Meanwhile the frame 3 maintains a substantially parallel relationship to the surface throughout the walking cycle. The curvilinear, substantially linear orbital foot movement of foot 33 (as opposed to a circular orbitation) also allows the foot 33 to be implanted upon the surface for a sufficient distance to move the walking unit 1 forward or backwardly. Contact between the walking surface and the foot 33 in a substantially linear pathway is maintained for about half of the revolutionary time interval of crank 13.

The connecting rod 21 connected to leg at knee joint 35 serves as a driving means for propelling leg 31 in a reciprocating arcual motion. Upon a 180° degree revolution of crank spindle 7, the connecting rod 21 will effectuate a complete leg lifting forward movement while for about the remaining 180° revolution of the crank, the connecting rod 21 is drawn backwardly as it simulates the grounded gait of the leg 31 in a walking sequence. This sequential movement or cycling of leg 31 may be reversed or altered as may be observed by the multiple legged walking devices 1 of FIGS. 11–16 and 18–19. By reason of the connecting arm 21 being linked to second rocker arm 7, the vertical and horizontal motion of the connecting arm 21 and leg 31 is linked to a prescribed orbital motion which includes a substantially linear movement when the foot 33 is grounded. This limitation in motion creates a cooperative arrangement of pivotally linked linkages which simulate the gaited walk of a legged animal and uniquely create locomotion for the walking device 1.

Figure 17:
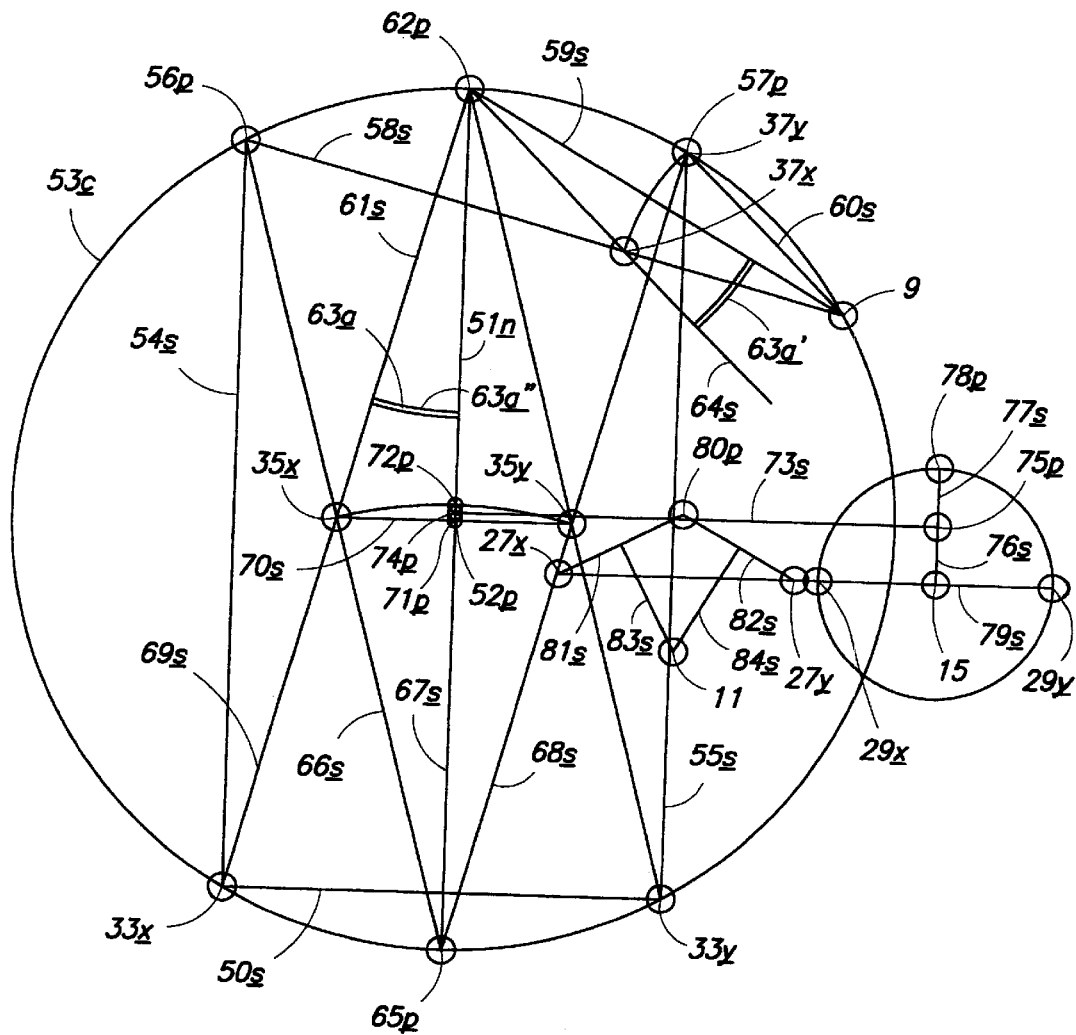
FIG. 17 illustrates a geometric representation for plotting and determining suitable axial coordinates for the walking devices.

The rocker arm axial connections (9 and 11) of the first rocker arm 5 and the second rocker arm 7 are geometrically positioned upon frame 3 so as to provide a walking device 1 generating a desired orbital pathway or stride for foot 33. The axial mounts $9_m$ and $11_m$ of the first and second rocker arms 5 and 7 are positioned at a prescribed interrelationship. Thus, when constructing the device 1 having a prescribed stride length and elevation, it is necessary for these axial mounts $9_m$ and $11_m$ to use coordinates which yield the desired stride. The rocker axle mounts $9_m$ and $11_m$ may be randomly chosen amongst an infinite number of possible coordinate sites, the choice of which primarily depends upon the desired gait. By configuring frame 3 in a triangular configuration, proper coordinate positioning for axle mounts $9_m$ and $11_m$ may be achieved while also providing a crank shaft mount $15_m$ for crank shaft 15 at the remaining triangular coordinate of the triangular frame 3. Suitable axle mounting positions for axle mounts $9_m$ and $11_m$, and crank mount, $15_m$ well as the remaining coordinating positions for other walking components may be computed mathematically or geometrically as illustrated by FIG. 17 and its use to plot coordinating values and positions.

Planar alignment of the linkages for the basic walking assembly 1 may be observed by referring in particular to FIGS. 1–10. Leg 31, second rocker arm 7 and crank 13 are appropriately placed in vertical or planar alignment with one another while the first rocker arm 5 and the connecting rod 21 are placed in separate planar alignment with one another but in a parallel planar relationship to leg 31, rocker arm 7 and crank 13. A first rocker arm spacer 6 of a thickness comparable to the thickness of leg 31 facilitates placing the first rocker arm 5 in proper alignment with hip joint 37 and leg 31 so as to provide the proper clearance and operation of the reciprocating components. As may be observed by referring particularly to FIG. 6; leg 31, second rocker arm 7 and crank 13 thus rest in planar alignment with one another while the first rocker arm 5 and the connecting rod 21 are in a second vertical or planar alignment with one another. Appropriate alignment may also be achieved by other conventional techniques such as an off-set or bent leg to compensate for the alignment difference.

FIG. 10 depicts an exploded elevational view of the parts of the basic walking assembly 1 of FIGS. 1–9 and reveals preferred embodiments of walking. assembly 1, some of which may be occluded from full view in FIGS. 1–9. As will be observed from FIG. 10, the appropriate link sites may be suitably provided with bushing or bearing mounts which serve to seat the bushing or bearing and axial components of the walking assembly 1. As may be further observed from FIG. 10, triangular frame 3 includes three bushing mounts, namely the second rocker arm bushing mount $11_m$, the first rocker arm bushing mount $9_m$ and a crank axle bushing mount $15_m$. Second rocker arm bushing $11_b$ seated onto second rocker arm bushing mount $11_m$ within which second arm axle 11 is axially connected to second rocker arm axle connection site $11_c$ serves to axially anchor the second rocker arm 7 to frame 3. Similarly, first anchor bushing $9_b$ seated in first rocker arm bushing mount $9_m$ of frame 3 within which first rocker arm axle 9 is journaled and connected to first rocker arm axle connecting link $9_c$ of the first rocker 5 arm which collectively serve to axially anchor the first rocker arm 5 to frame 3. It should be further observed that the first rocker arm spacer 6 serves to provide the appropriate spatial relationship between leg 31 and first rocker arm 5.

Similarly, to enhance pivotal movement, crank shaft bushing $15_b$ is seated in crank axle bushing mount $15_m$ of frame 3 within which crank shaft 15 is axially mounted and connected to crank axle connecting link $15_c$. Since the walking assembly or device 1, as depicted in FIGS. 1–10, includes only one leg, there is no necessity for the crank shaft 15 of the single legged walking device 1 to be interconnected to other cranks, (generally prefixed by number 13) and legs 31 as illustrated in FIGS. 11–16 and 18–19. If desired, the crank shaft 15 may be extended and connected with an additional or multiple crank shafts 15 on the opposite side of the frame 3 as shown in FIGS. 11, 14–15 and 18–19. Crank shaft 15 provides a suitable drive source for connecting a power source 29 to the walking device 1 for powering at least one or more crank linkages 13.

As illustrated by FIG. 10, hip joint 37 may appropriately include a hip joint bushing mount $37_m$ for receiving hip axle bushing $37_b$ and hip axle $37_a$ connected to hip coupling mount $37_c$ of the first rocker arm 5. In a similar fashion, knee joint 35 may appropriately include a knee joint bushing mount $35_m$ of leg 31 for receiving knee bushing $35_b$ and knee axle $35_a$ which is seated to knee coupling mount $35_c$ of connecting arm 21. A second rocker arm 7 is shown in FIG. 10 as including an elbow bushing mount $27_m$ for seating elbow bushing $27_b$ and elbow axle $27_a$ which, in turn, is axially connected to elbow connecting site $27_c$. Similarly, crank 13 includes a crank rod bushing mount $17_m$ for seating crank rod bushing $17_b$ and crank rod 17 which is connected to crank connecting mount $17_c$ (occluded from view) of connecting rod 21.

Figure 15:
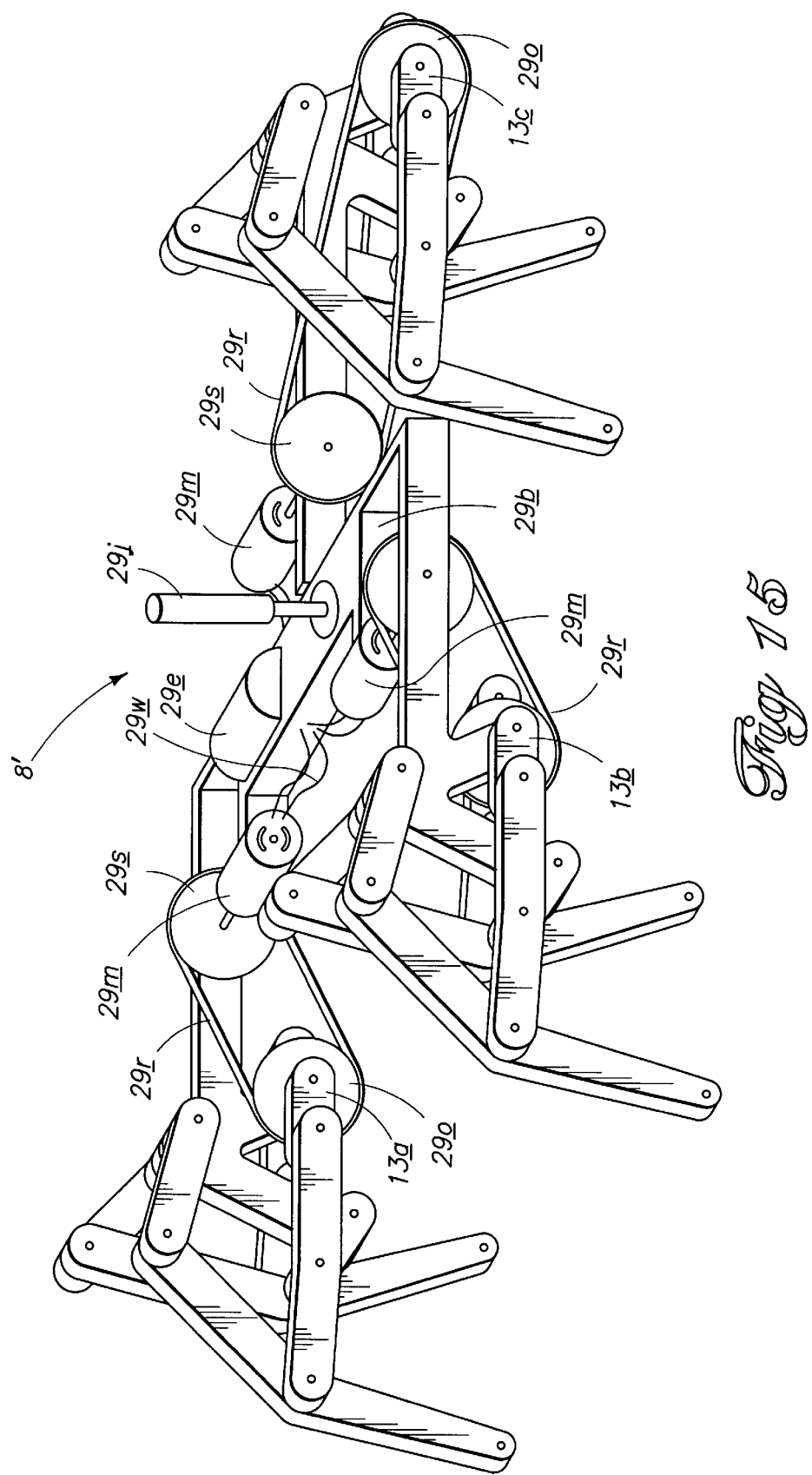
FIG. 15 depicts a motorized version of the walking device depicted in FIG. 14.
Figure 18:
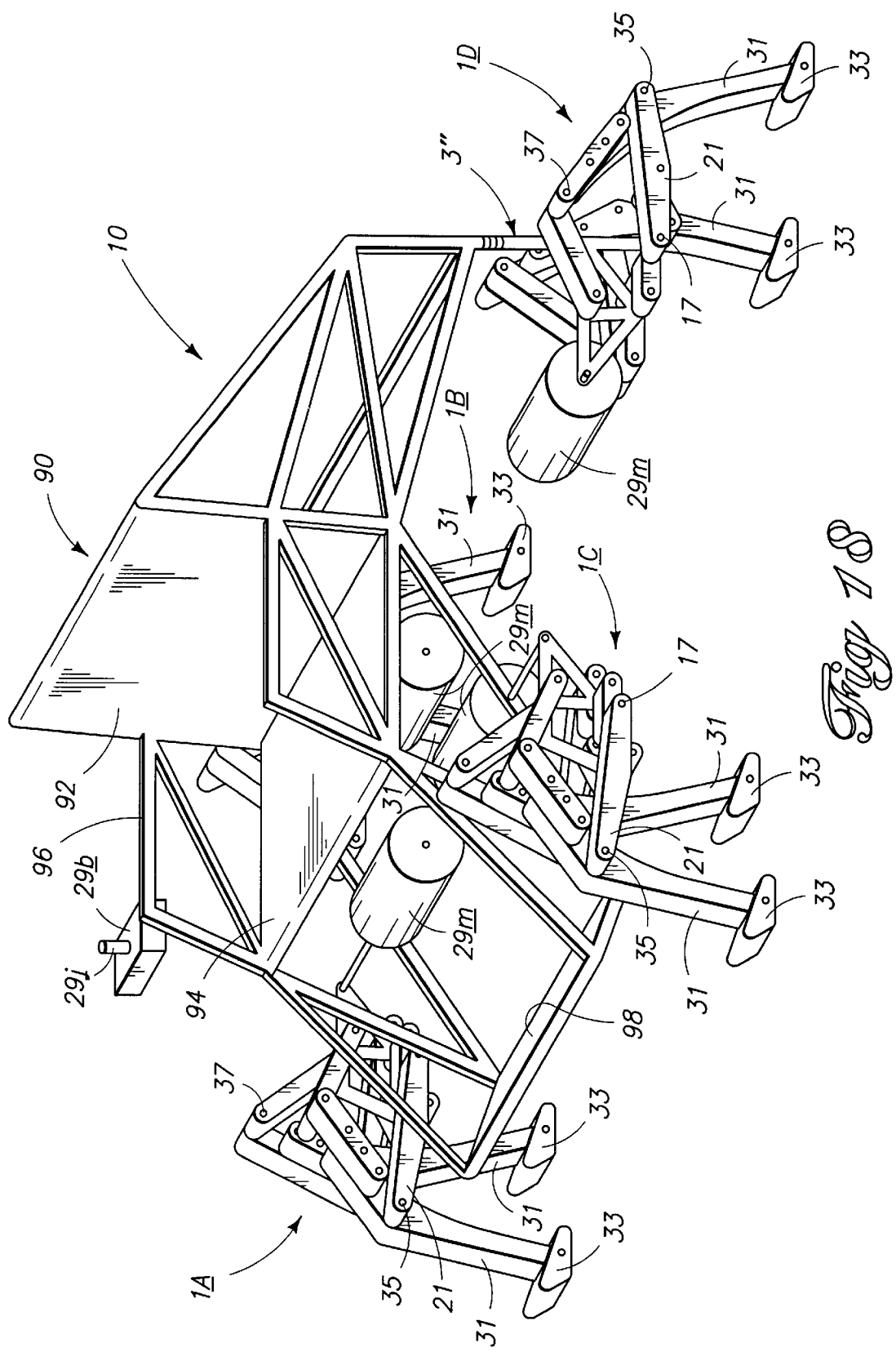
FIG. 18 is an elevational isometric view of a motorized wheelchair equipped with an eight-legged walking device of this invention.
Figure 19:
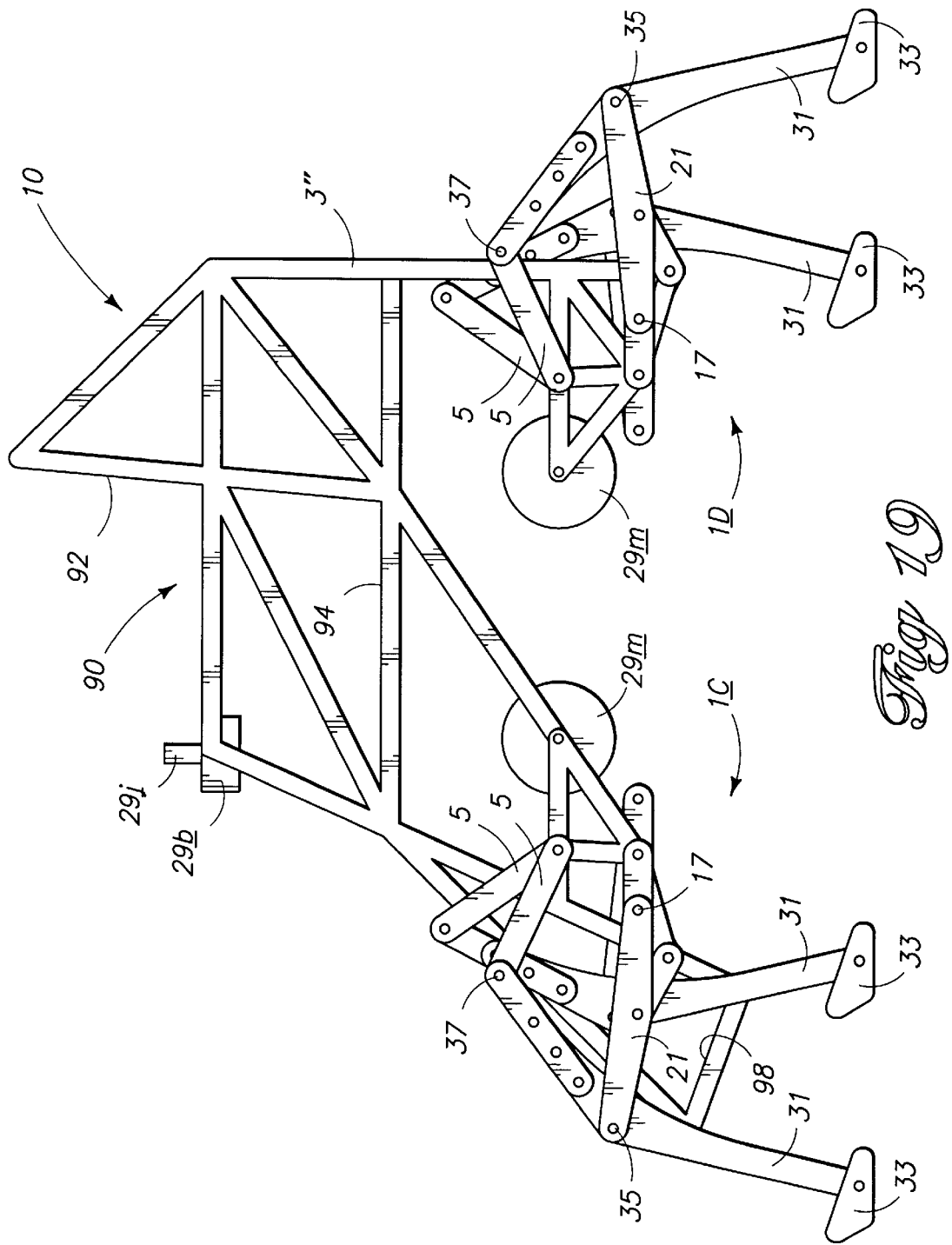
FIG. 19 is a side elevational view of the eight-legged device shown in FIG. 18.
Figure 20:
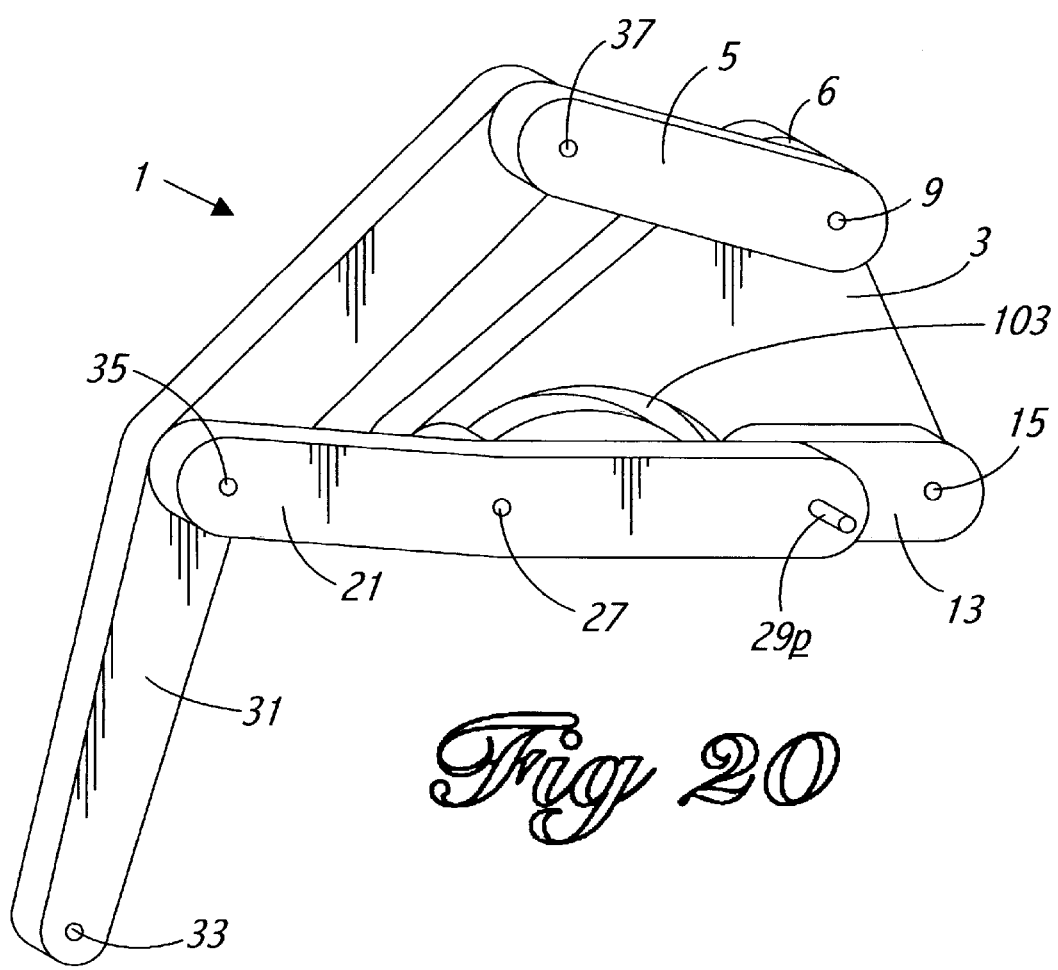
FIG. 20 is a side elevational view of another embodiment of a single legged walking device of this invention equipped with an arcuate sliding joint for controlling the orbital pathway of a leg depicted in the fully extended grounded stride position.
Figure 21:
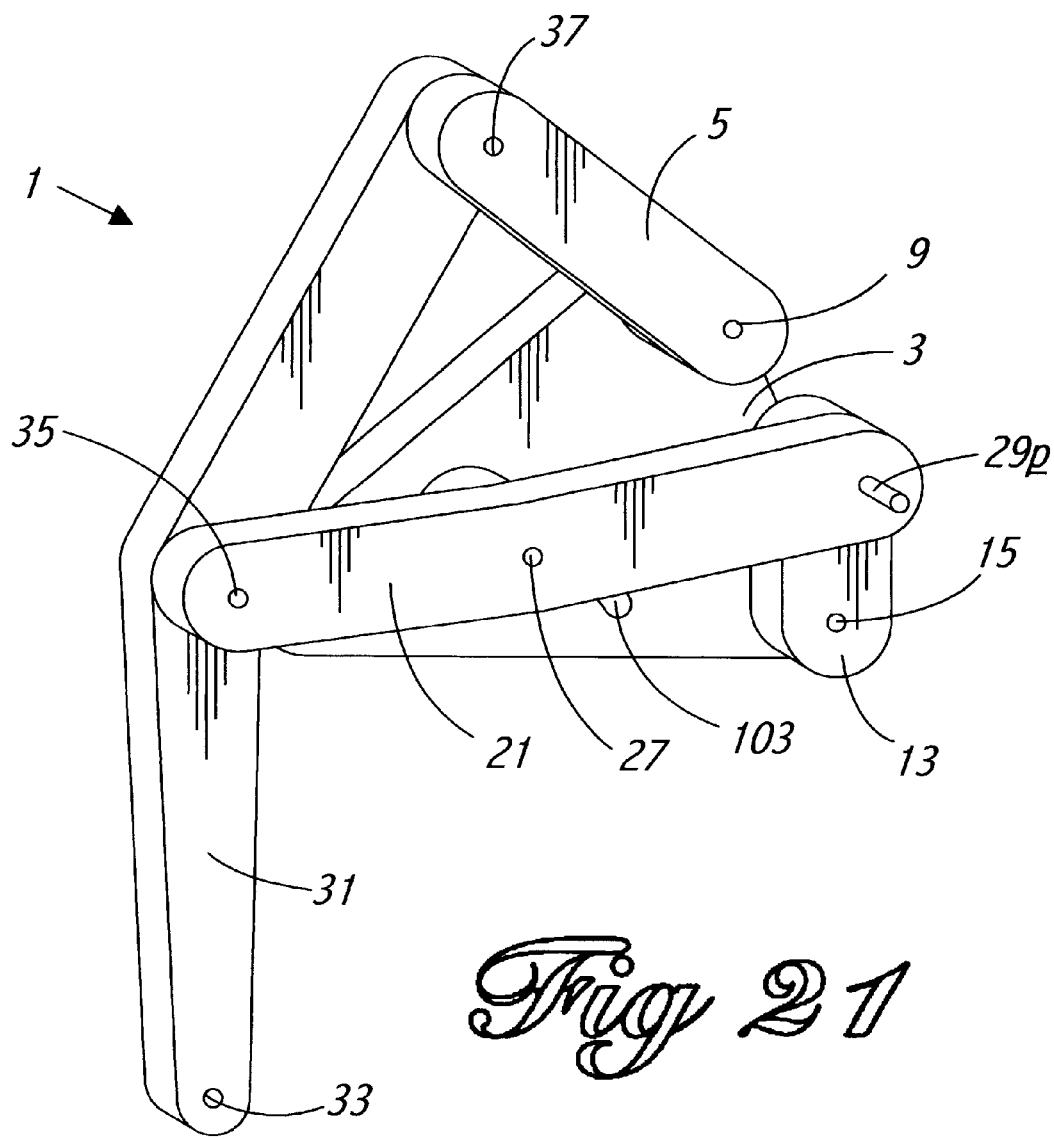
FIG. 21 depicts the walking device shown in FIG. 20 with the leg shown in an intermediate grounded stride position.
Figure 22:
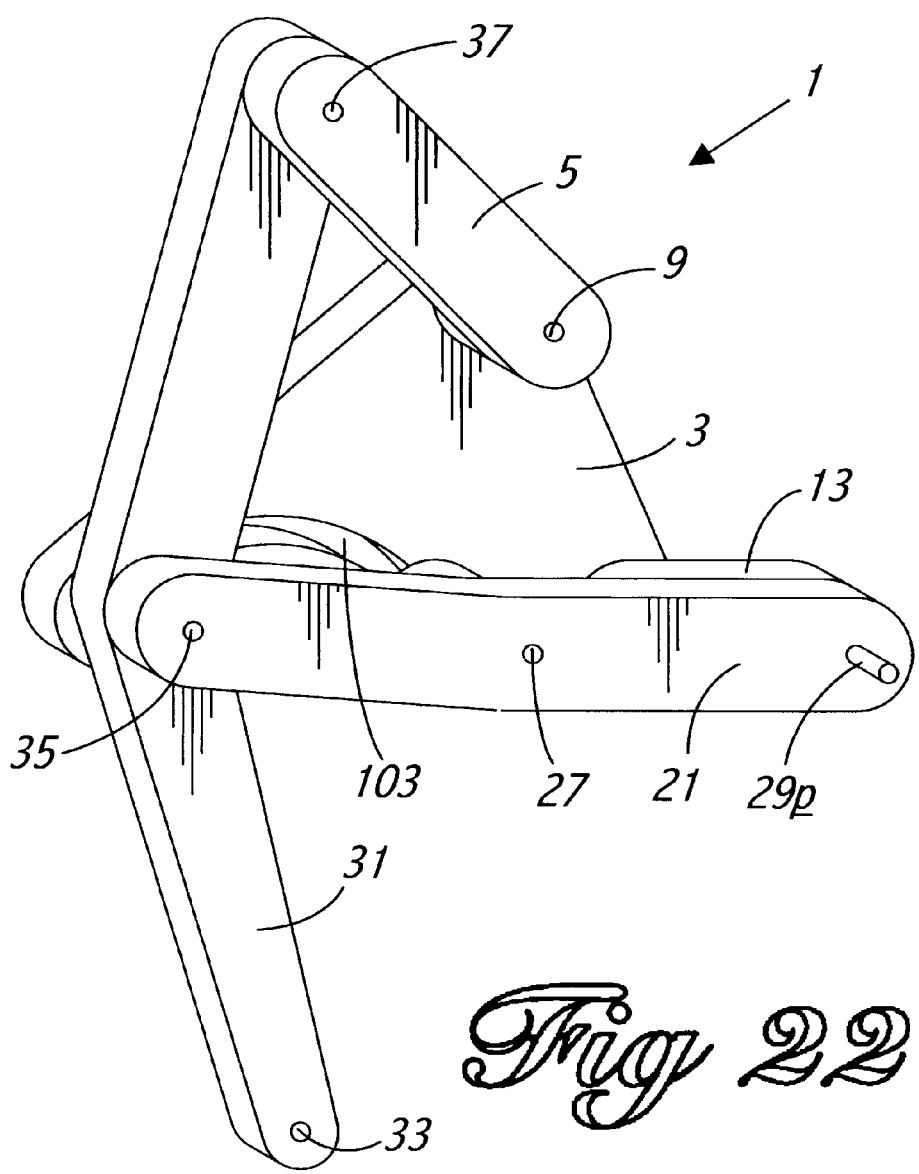
FIG. 22 shows a side elevational view of the device shown in FIG. 20 depicting the grounded leg at the end of the grounded gait position.
Figure 23:
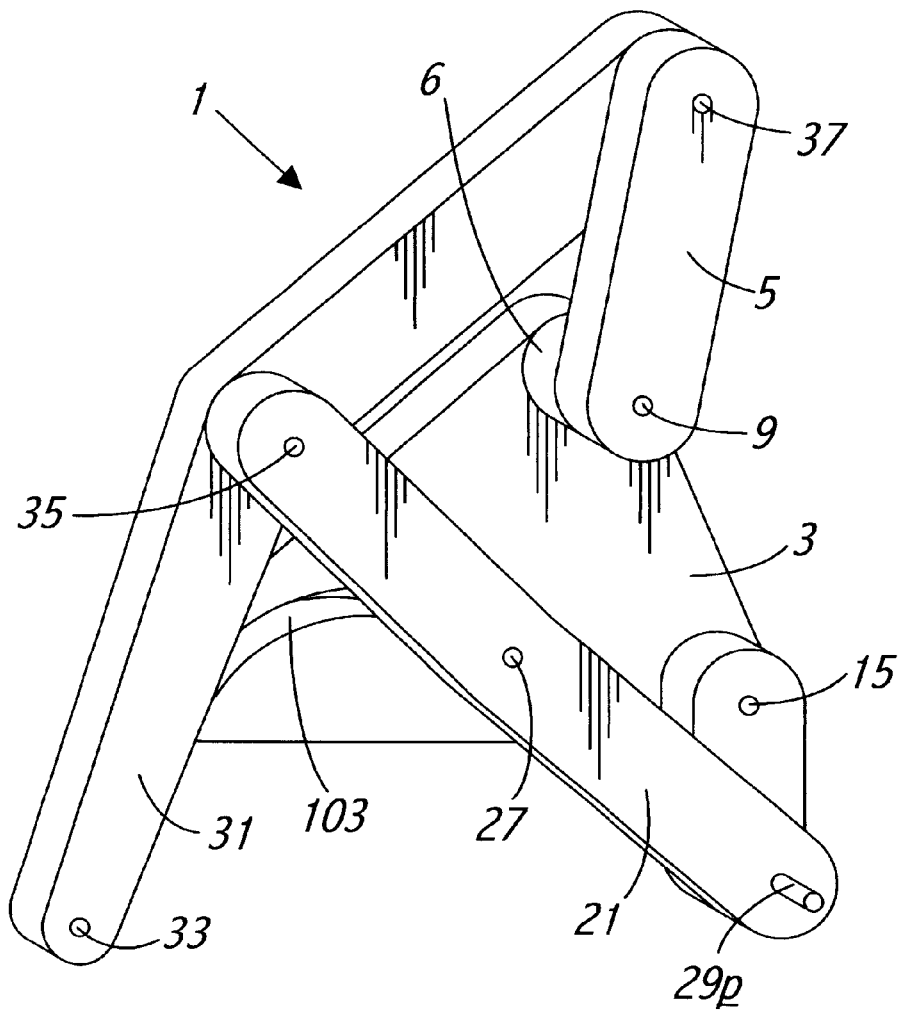
FIG. 23 is a side elevational view of the legged walking device shown in FIG. 20 with the leg being depicted in an elevated position.
Figure 24:
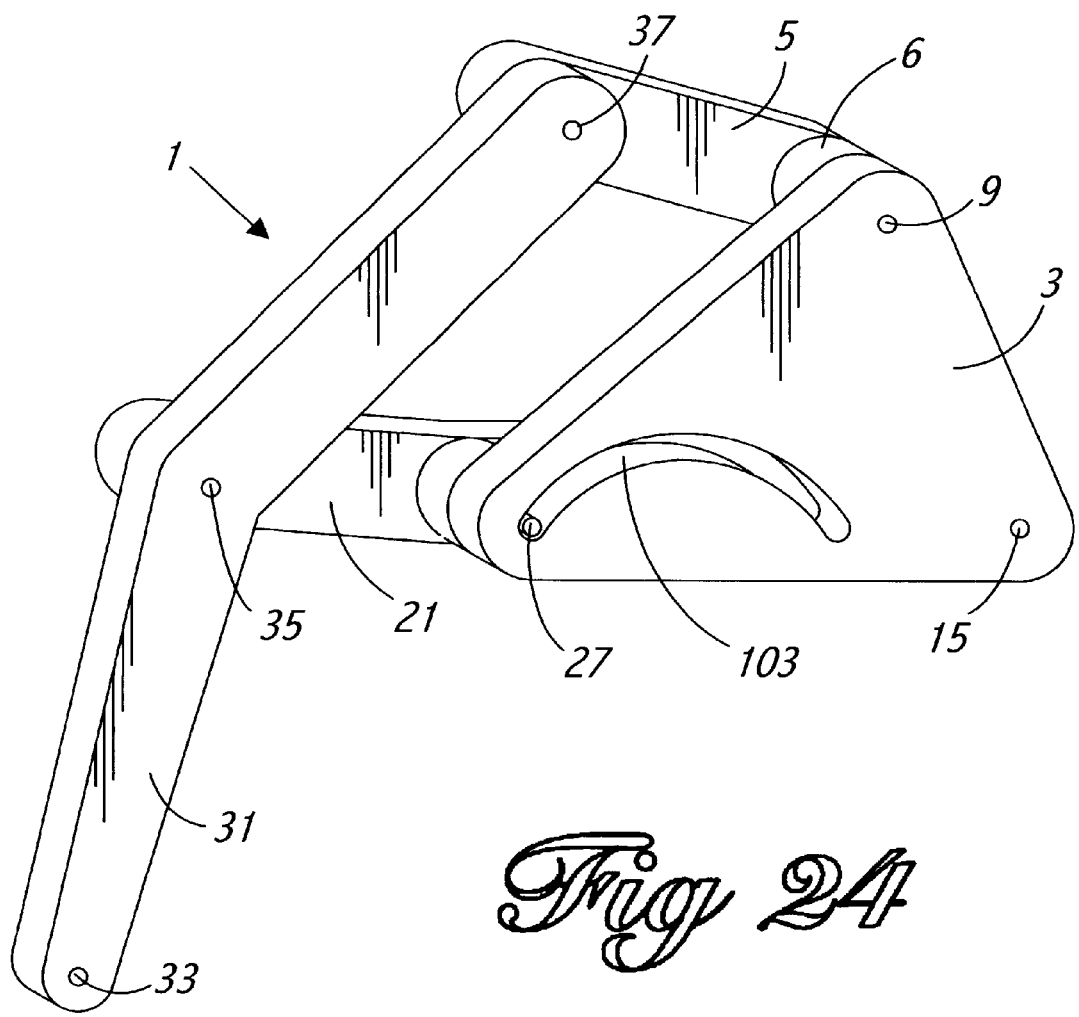
FIG. 24 depicts an opposite side elevational view of the device shown in FIG. 20.
Figure 25:
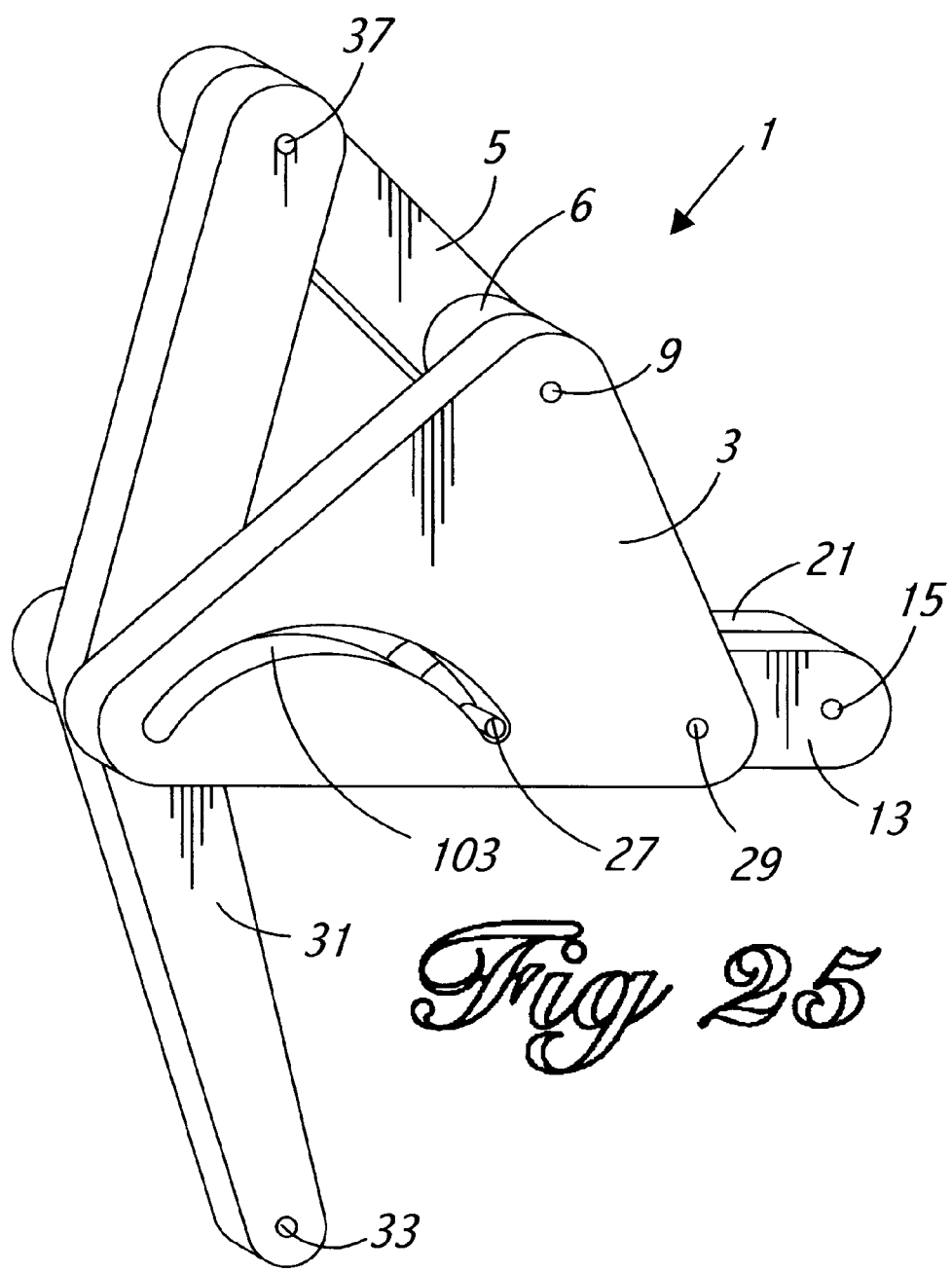
FIG. 25 is an opposite side elevated view of FIG. 22.
Figure 26:
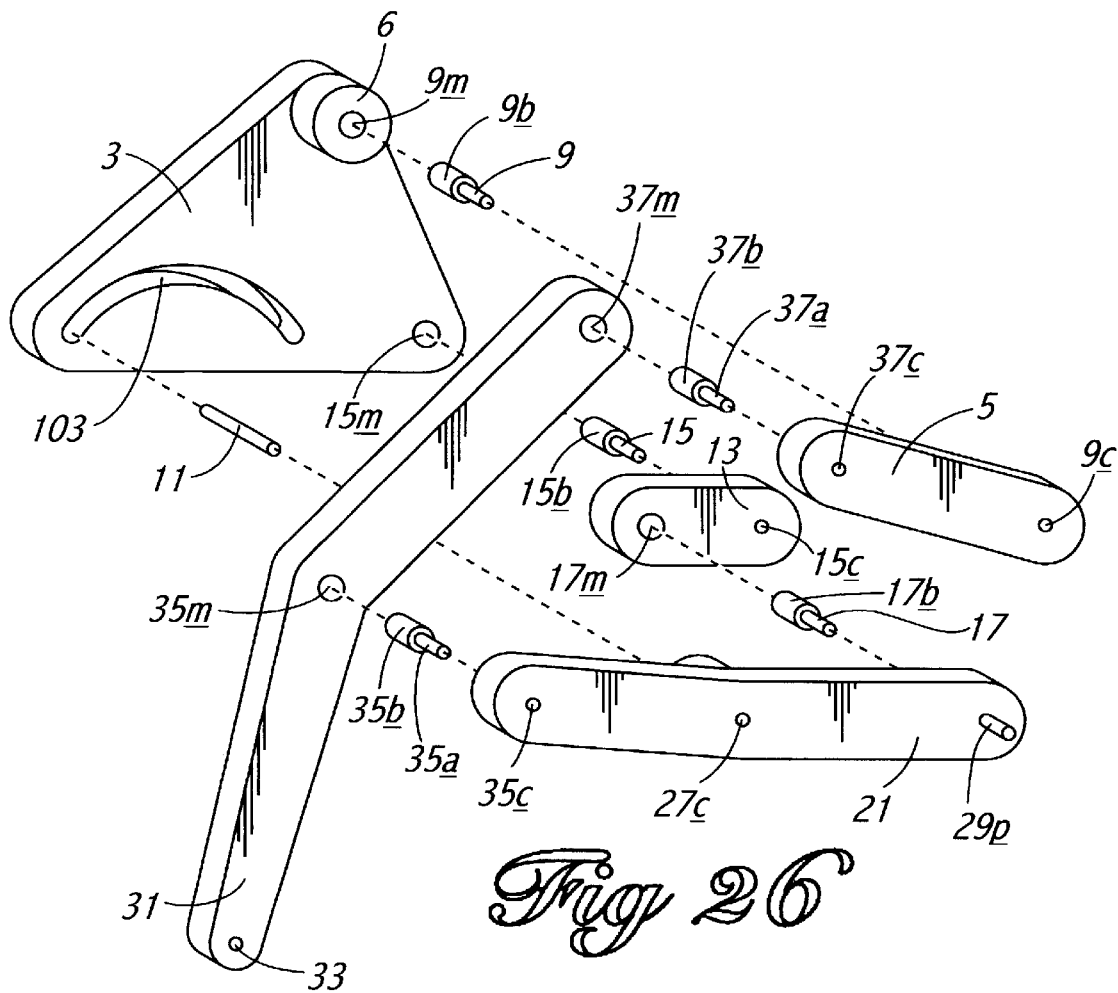
FIG. 26 is an exploded view of the components for the device of FIGS. 20–25.
Figure 27:
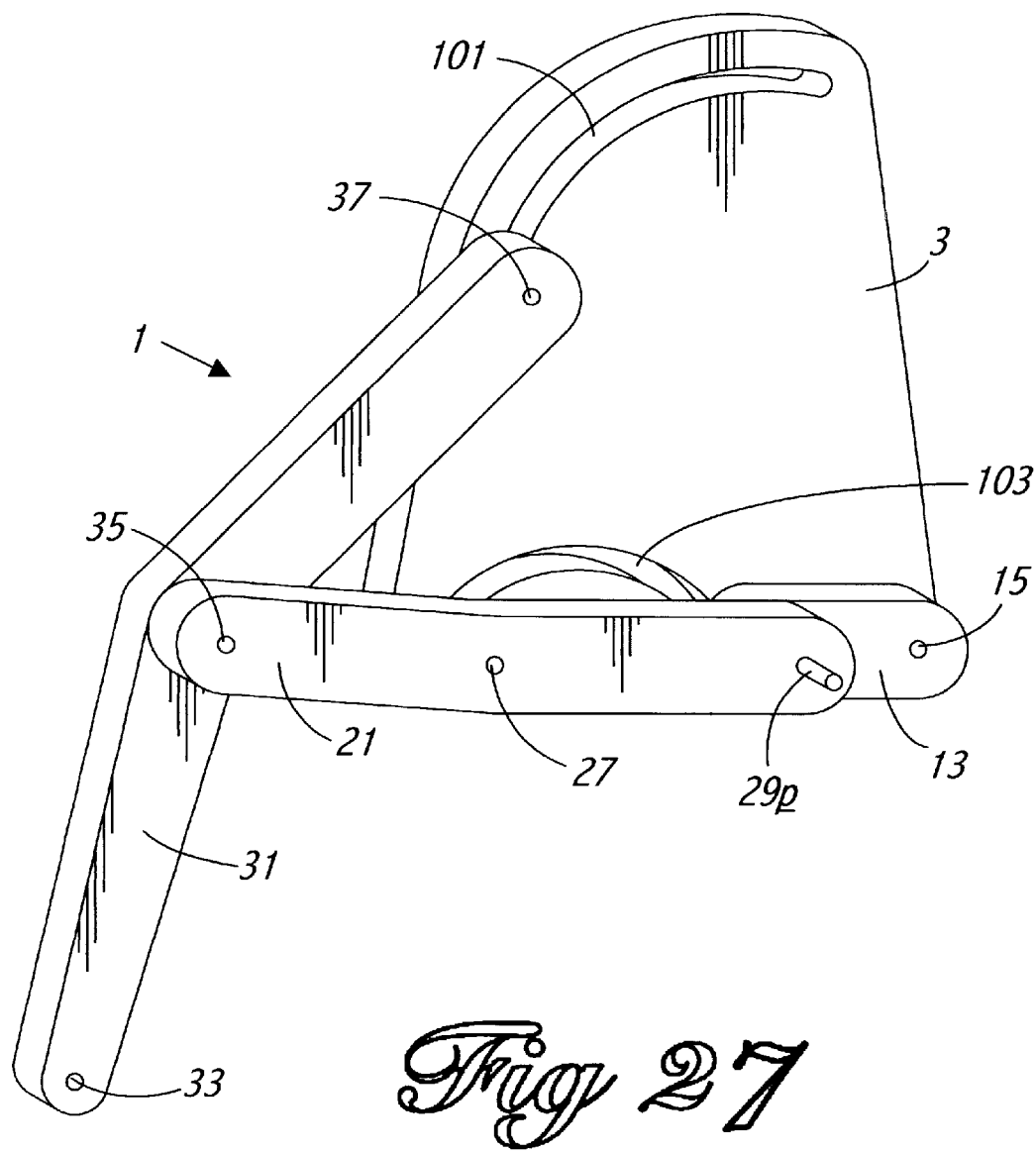
FIG. 27 is an elevational side view of a modified single legged walking device embodying a pair of the sliding joints instead of the rocker arm as illustrated in FIGS. 1–18 at the gaited leg position as shown in FIGS. 1 and 20.
Figure 28:
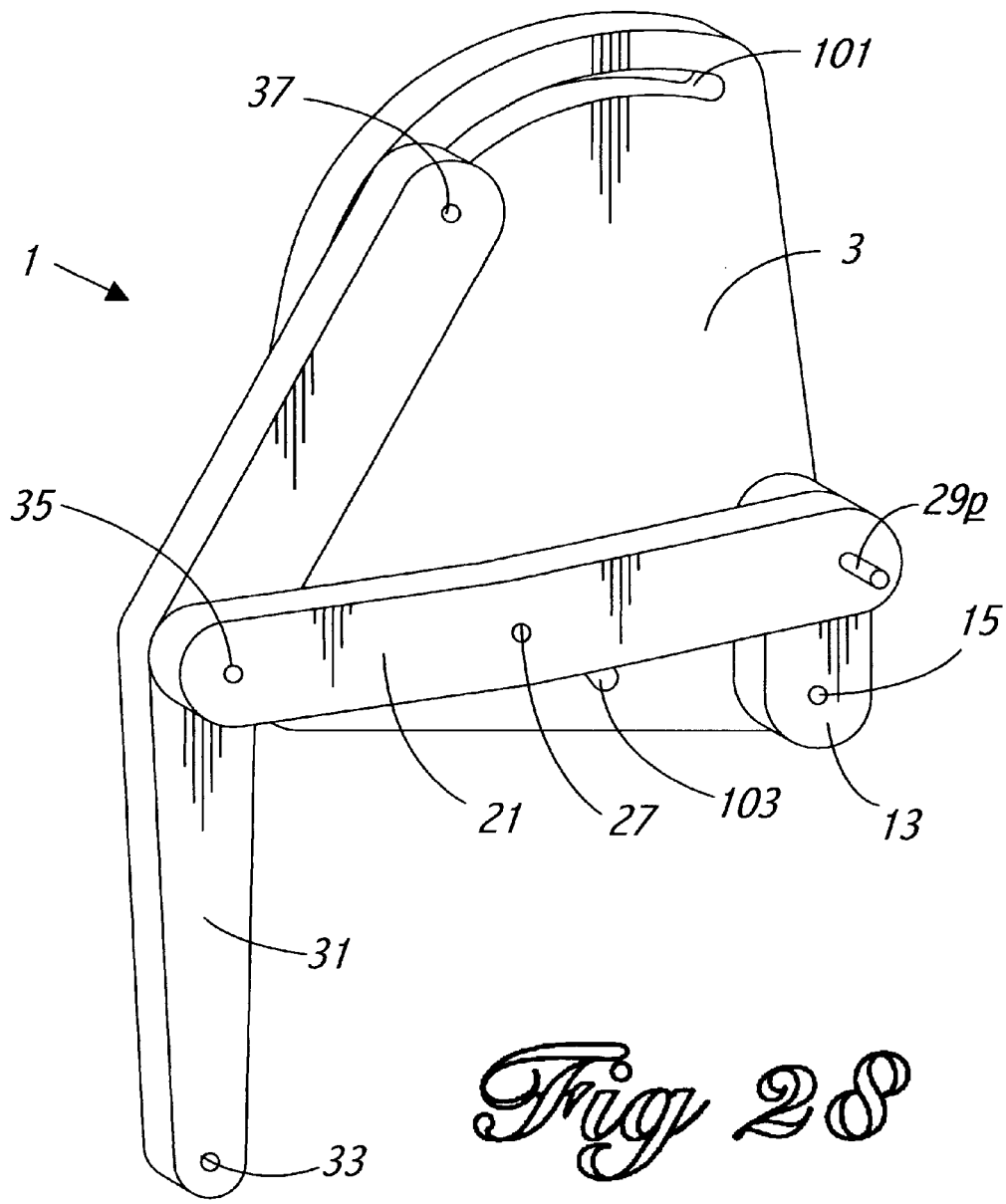
FIG. 28 depicts the legged walking device of FIG. 27 positioned at an intermediate grounded stride position.
Figure 29:
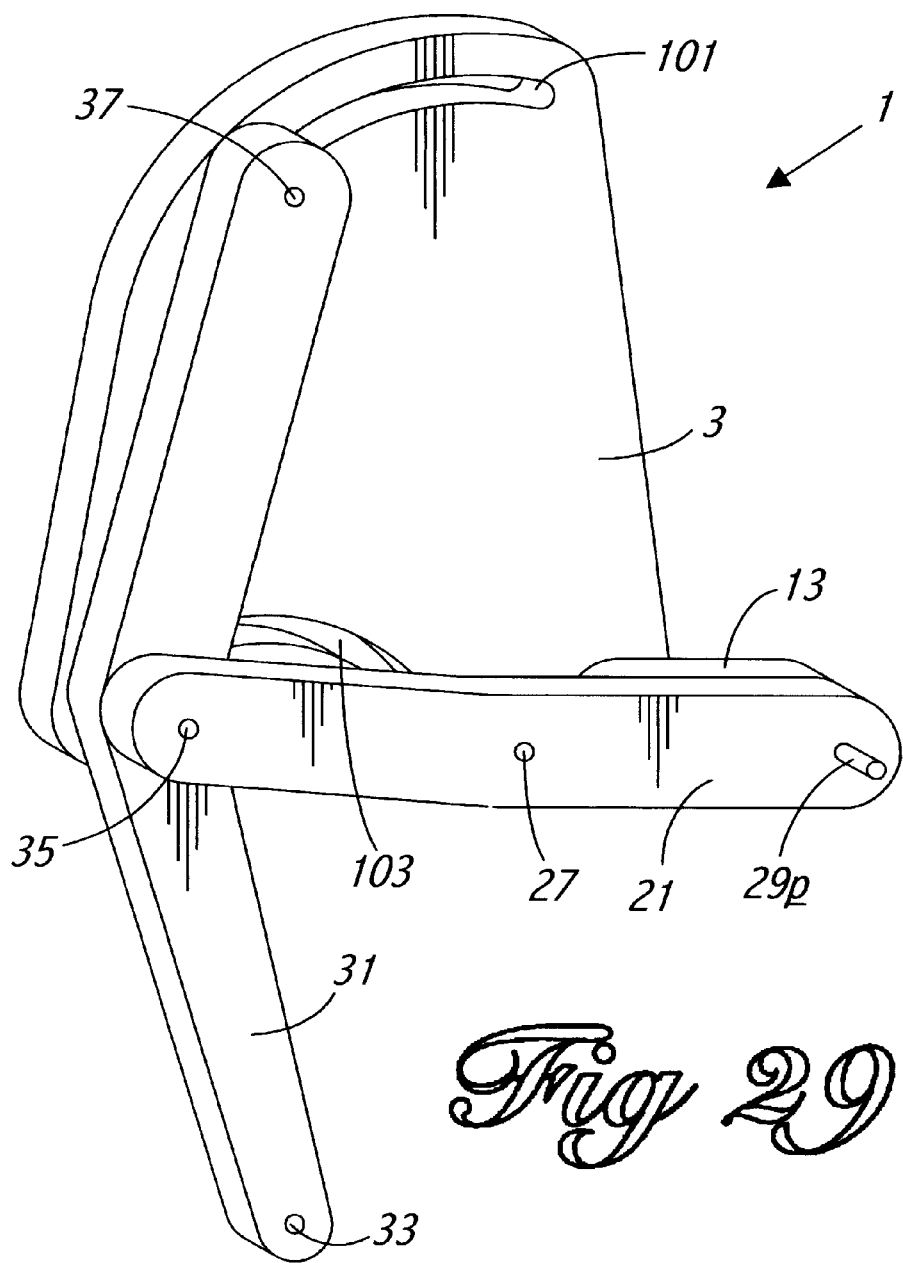
FIG. 29 shows a side elevational view of the device shown in FIG. 27 depicting the grounded leg at the end of the grounded gait position.
Figure 30:
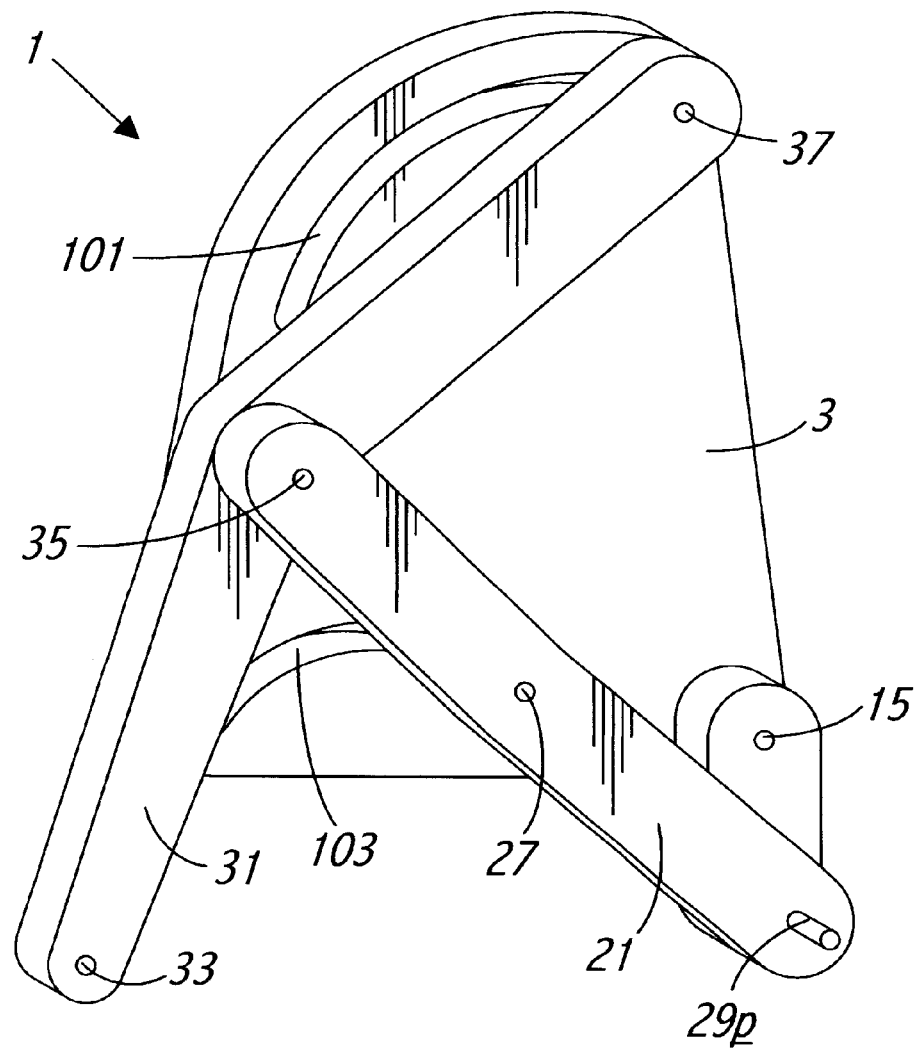
FIG. 30 is a side elevational view of the legged walking device shown in FIG. 27 with the leg being depicted in an elevated position.
Figure 31:
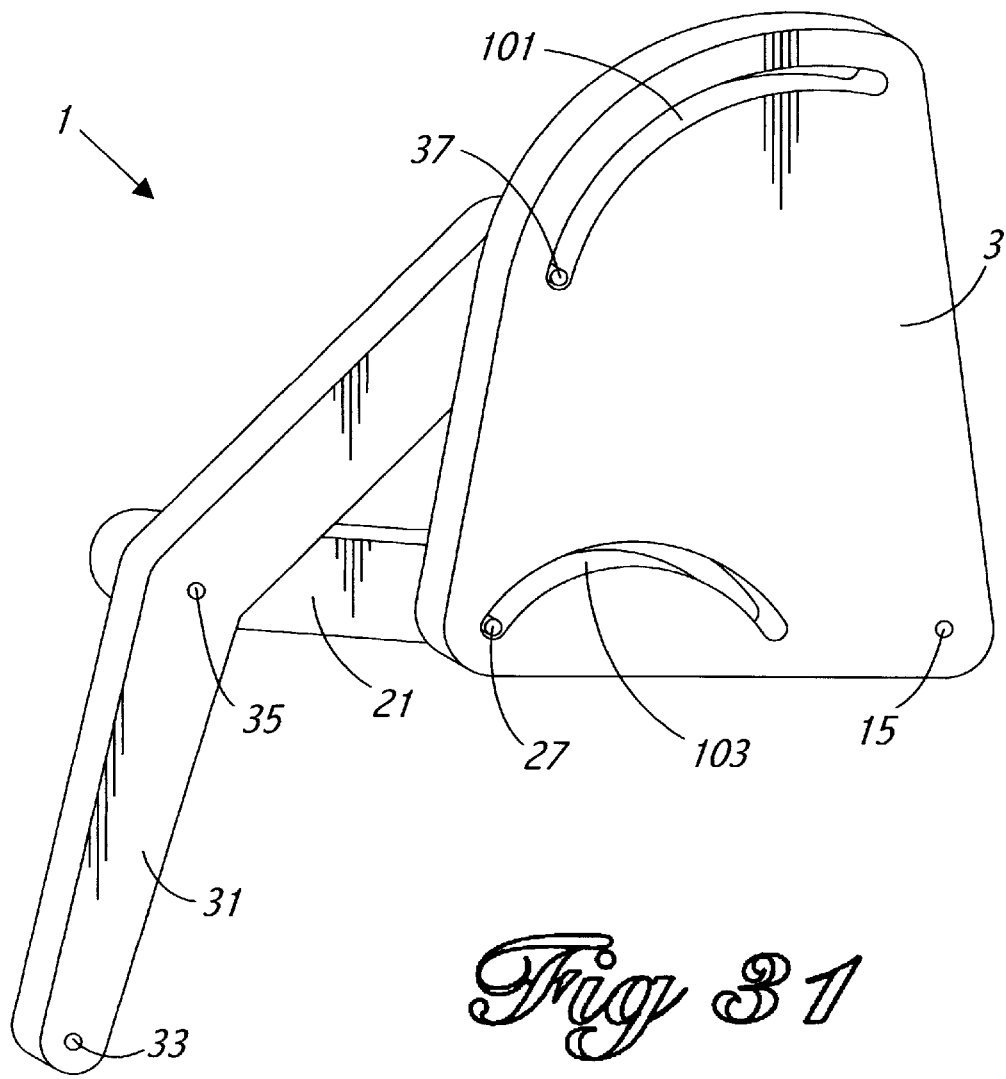
FIG. 31 depicts an opposite side elevational view of the device shown in FIG. 27.
Figure 32:
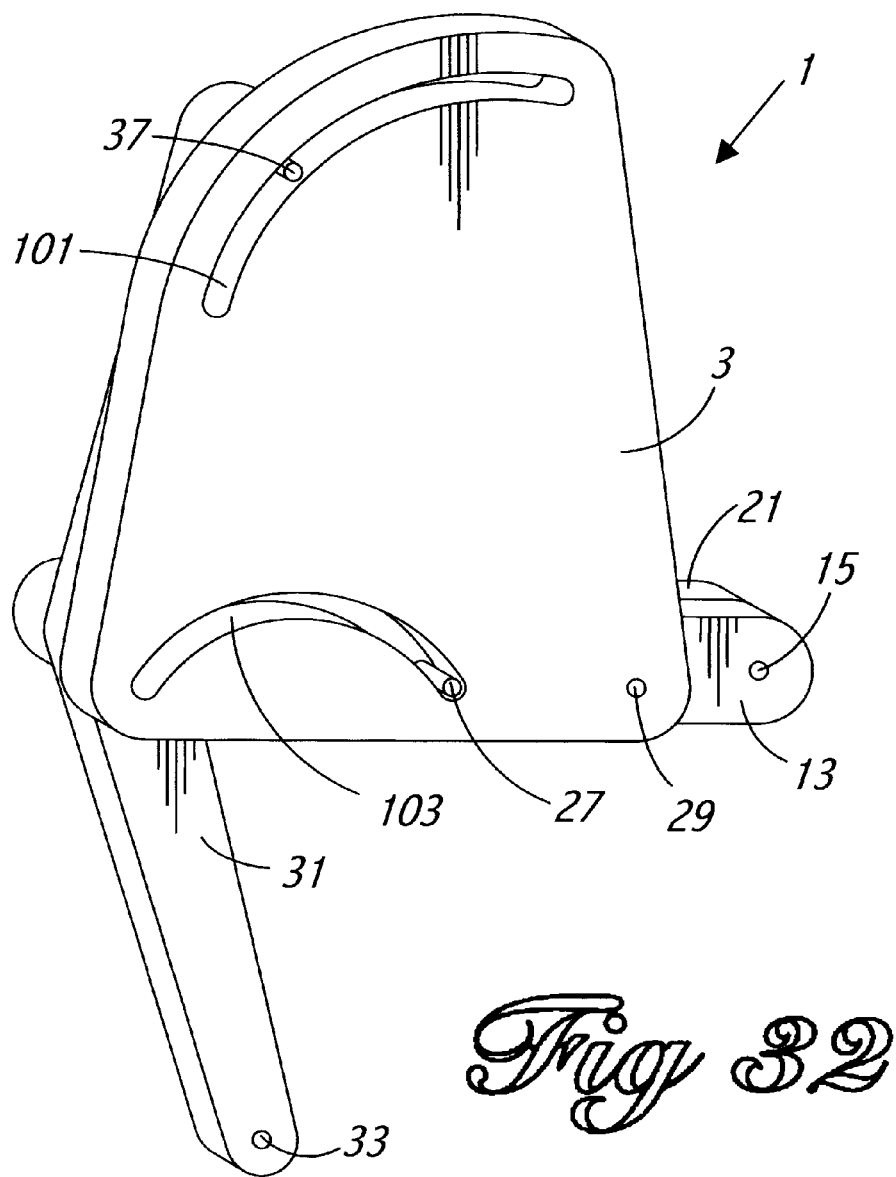
FIG. 32 is an opposite side elevated view of FIG. 29.

In the drawings, FIGS. 1–13 are depicted as including a crank handle or pedal $29_p$. As may be observed from the manually powered walking assemblies 1 depicted in the drawings, crank rod 17 may be appropriately extended so as to provide a crank rod handle $29_p$ as illustrated in FIGS. $1_{11}$ or a foot pedal $29_p$ as illustrated in FIGS. 12 and 13. In the motorized units, the power may be directly applied to crank shaft 15 by motor $29_m$ to power the walking device 1 as shown in FIGS. 15 and 18–19. A single legged walking device 1 may be utilized to provide locomotion and traction to other movable objects such as a cart, sled, conveyor, spout, turnstile, gate, etc.

A series of basic walking assemblies 1 may be assembled together from the basic walking structure 1 of FIGS. 1–10 to provide various walking devices 4, 8, 8', and 10 simulating a walking gait of a multiple legged animal as illustrated by FIGS. 12–16 and 18–19. If desired, a series of tandemly positioned legs 31 in a fashion similar to those of a centipede may be secured to a common frame 3'. In the absence of a balancing system, the walking device 1 will advantageously include two or more walking assemblies (i.e. two or more legs) and preferably at least a three paired legged walking device 4, 8, 8' or 10 such as illustrated by FIGS. 14–15 and 18–19 with the legs 31 being positionally cycled so as to stabilize the device against tipping when powered to walk or run. When utilizing three legs 31, the motion of the legs 31 may be appropriately synchronized so that two of the legs 31 are simultaneously grounded while the third leg 31 is in the lifting forward moving gait cycle. By timing the reciprocating motion of the connecting rod 21 and connecting legs 31 at cycling 120° intervals, each of the legs 31 will be undertaking a sequential staging of an isometric gait.

Figure 11:
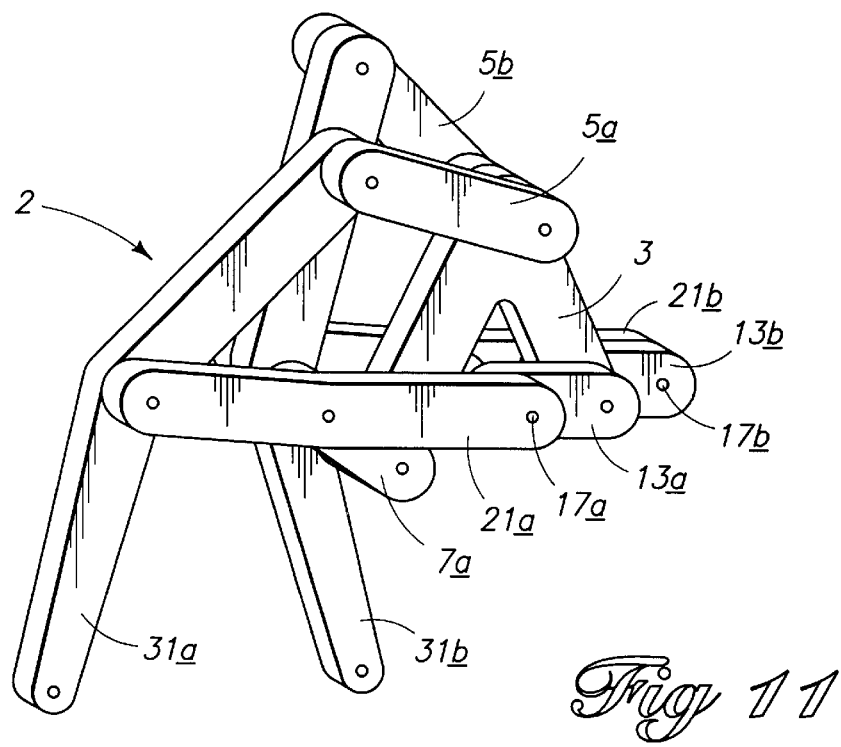
FIG. 11 depicts a side elevational view of a two legged walking device of this invention.
Figure 16:
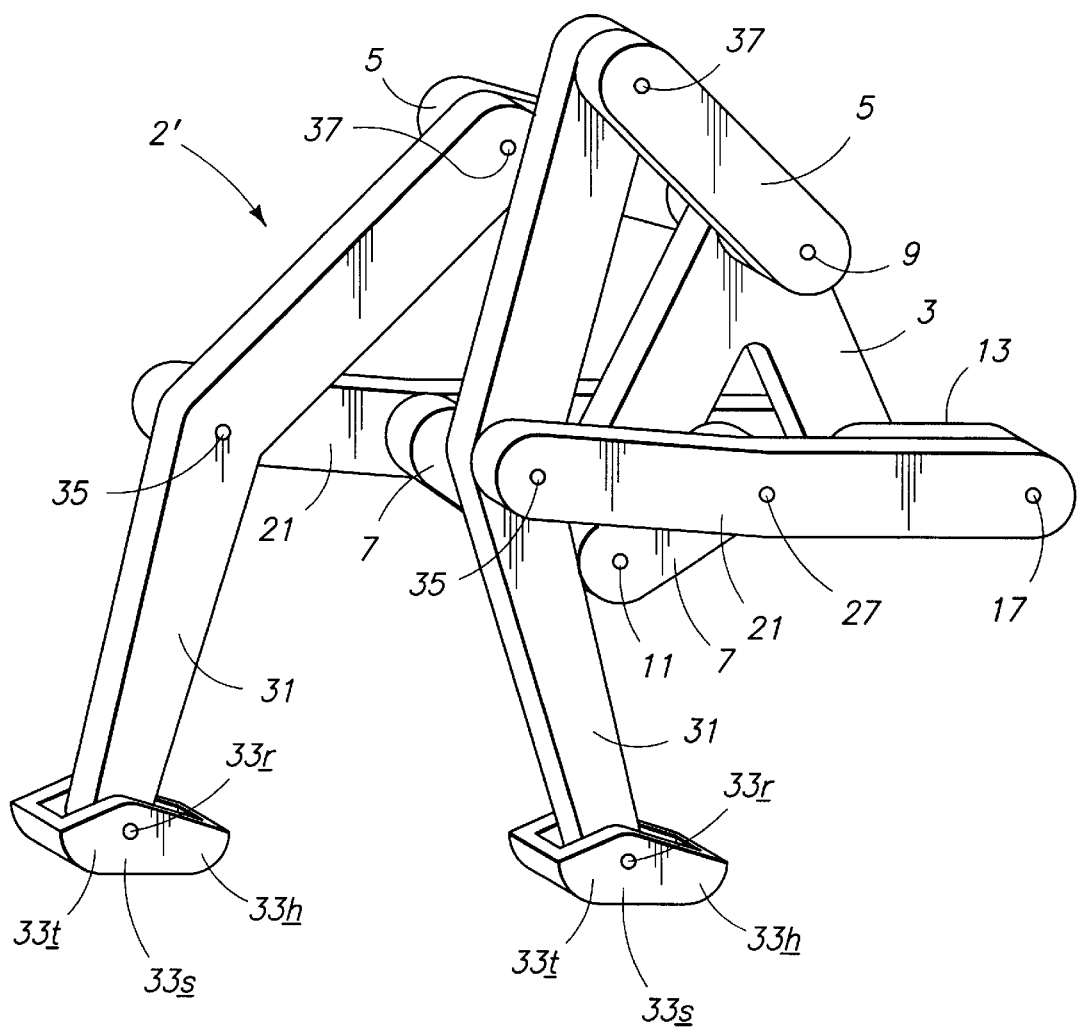
FIG. 16 depicts an opposite elevational side view of the device shown in FIG. 11 fitted with hinged shoes.

The staging or cycling of the gaited position of the legs 31 so as to simulate the walking gait of a human may be observed by referring in particular to FIGS. 11 and 16, which illustrate a walking device 2 or 2' equipped with two basic walking assemblies. This is accomplished by placing two basic walking assemblies, as depicted by FIGS. 1–10, in a side by side relationship upon a common triangular frame 3 as shown in FIGS. 11 and 16. When referring to multiple legged assemblies 2, the various component parts of the walking assembly bear the same enumeration as applied to the single legged device 1 except for an alphabetical suffixing thereto. In the multiple legged devices 2, duplicate components may, accordingly, be suffixed by capitalized or uncapitalized alphabetical indexing. Thus, in FIGS. 11 and 14, various linkages of the walking device 2 have been suffixed by an alphabetical subscript (a or b) so as to indicate whether a left- or right-handed component of the walking device 2 is depicted therein.

When the left leg $31_a$ is in the most rearward position of FIG. 11, the right leg $31_b$ is initially implanted onto the surface or the ground. This sequential coordination of the left leg $31_a$ and the right leg $31_b$ is achieved by connecting connecting rods ($21_a$ and $21_b$) to the crank spindles ($17_a$ and $17_b$) in a spatially phased 180° relationship to one another. Thus, when the right leg $31_b$ is drawn to its most rearward position by connecting rod $21_b$ and spindle $17_b$ the right connecting rod $21_b$ will be at its most rearward position as will its relative position (180°) upon the spindle $17_b$. In contrast, left leg 31a will be thrust forward to its most forward grounded stride positioned with spindle $17_a$ being positioned at the 0° position. Each leg ($31_a$ and $31_b$) will, accordingly, be appropriately positioned to provide the sequential positioning of the respective legs 31 in a normal walking mode.

The device may suitably include locomoting or drive means (generally referenced as 29) for powering the walking device. The locomoting means 29 may comprise manual drive means such as a crank handle, foot pedal $29_p$, etc. as illustrated in FIGS. 12 and 13 or by fitting crank pin 17 with an extended crank handle $29_p$ as illustrated in FIGS. 1–11. The walking or running speed of device 1 will depend in part upon the rotational speed or r.p.m. of crank 13. Other independent factors bearing upon the operational speed relate to the stride length which may be altered by the length of leg 31, rocker arm linkage 5 and 7 length, positional placement of the mounting sites of rocker arms 5 and 7 upon the frame 3, reciprocating traversing distance of connecting rod 21 and the radius or distance between crank shaft 15 and crank rod 17. Similar to walking patterns, a reversal of the direction in which crank 13 rotates will effectuate a reversal in the direction of the stride. The crank 13, as depicted in the views of FIGS. 1–4, 11, 14–15 and 18–19, when rotating in a clockwise manner will produce a normal forward stride direction while a counterclockwise movement causes the legs 31 to move backwards.

In the tandem legged walking device 4 shown in FIGS. 12 and 13, walking device 4 may be powered manually or by motorized means operatively connected in place of the foot pedal $29_p$ and operatively connected to the crank axle (occluded from view). If desired, power may be applied either manually or by means of a motor to either the front sprocket $29_s$, or rear sprocket $29_o$. As may be observed from FIGS. 12 and 13, operational movement of pedal $29_p$ will rotationally rotate sprocket $29_s$ which, in turn, drives chain $29_c$ to propel sprocket $29_o$, Chain drive $29_c$ serves to drive the rear legs 31 of the tandemly connected legs 31. As may further observed from FIGS. 12 and 13 the forward leg assembly and the rear assembly are phased at a 180° differential. The forward leg is are shown in the fully extended grounded position with rearward leg 31 being depicted in its rearward most grounded position. Further movement of chain $29_c$ will result in the rearward leg 31 to be lifted off the ground while the forward leg 31 will continue its rearward movement along the surface until rod 17 rotates another 180°.

Figure 14:
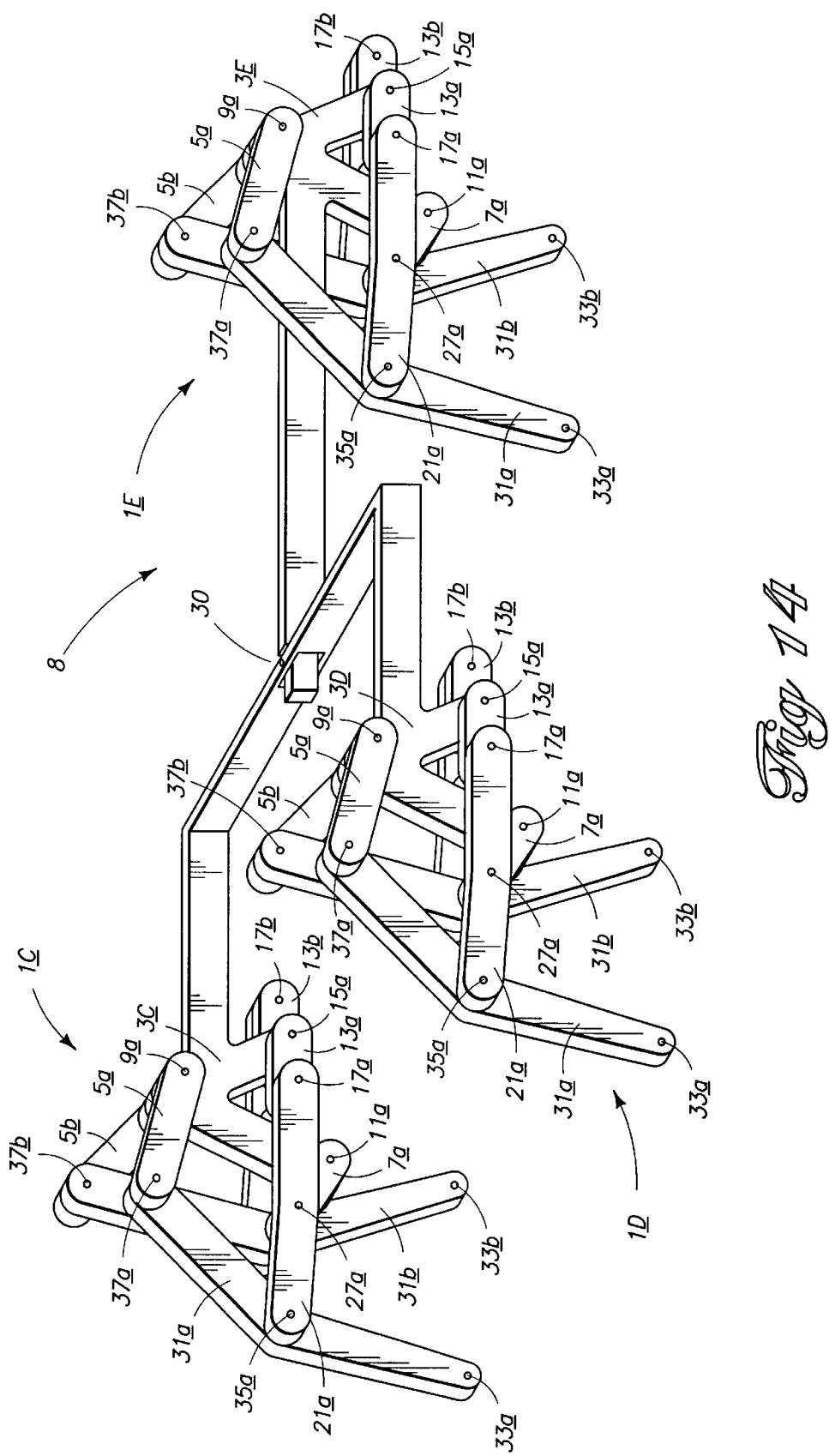
FIG. 14 is a side elevational view depicting a six legged walking device of this invention.

FIG. 14 depicts a manually operated walking device in which three of the walking assemblies 1 as disclosed in FIG. 11 have been integrated together ($1_C$, $1_D$ and $1_E$) to form a six legged walking device 8. As may be also observed in FIG. 14, the paired legs of each of the walking assemblies ($1_C$, $1_D$ and $1_E$) are timed so that the paired legs are at a 180° cycling differential as depicted in FIG. 11. The walking device, as depicted in FIG. 14, includes sufficient legged ground supports so as to maintain its stability when placed in motion. The two paired front assembly units $1_C$ and $1_D$ are positioned in a parallel and lateral alignment with one another, whereas the trailing unit $1_E$ bisects the lateral placement of the two front units $1_D$ and $1_C$. As will be observed from FIG. 14, the rear unit $1_E$ is articulated to the front frame at articulating joint 30 so as to permit the rearward unit $1_E$ to trailer and follow behind the forward units $1_C$ and $1_D$. As will be explained in greater detail in reference to the motorized FIG. 15 version of FIG. 14, turning may be effectuated by moving the forward units $1_C$ and $1_D$ at different speeds while a constant speed applied to the two forward units $1_D$ or $1_E$ will generally result in a straight line movement of the walking assembly 8. Thus, if it is desired to turn right with the walking assembly 8 as depicted in FIGS. 14 and 15, the right paired legs 31 of $1_D$ could accordingly be slowed down while the left paired legs 31 of $1_C$ would be accelerated so as to effectuate a turning to the right. For turning to the left, the right paired legs 31 would, accordingly, move at a faster rate than the left paired legs 31 thereby allowing a turn to the left. By articulating the rear assembly $1_E$ at joint 30, the rear assembly $1_E$ simply follows the turning movement of the two forward assemblies $1_C$ and $1_D$.

In an alternative embodiment of the invention as depicted in FIGS. 15 and 18–19, walking device 8' or 10 may be equipped with motors $29_m$ connected to a suitable energy source (battery $29_e$) and control box $29_b$ for powering walking device 8' or 10. Any motorized power source (electrical, spring, combustion, etc. engine) may be used to power or drive device. In the depicted motorized version of FIG. 15, three separate variable-speed, battery-operated, direct-current motors $29_m$ are connected to a battery source $29_e$ and regulated by a control box $29_b$ so as to permit navigation of the device along a desired pathway. When all three variable speed motors $29_m$ are operated at the same rotational speed, device will travel along a straight path. When one pair of legs 31 of the forward units ($1_C$ or $1_D$) of the device is operated at a slower speed than those paired legs 31 on an opposite lateral side of the device the device will turn towards the side with the slower operational pair of moving legs 31. Thus, by varying the speed of variable speed motors $29_m$ the device shown in FIG. 15, can be turned right or left or allowed to go straight simply by varying the speed of motors $29_m$ and the r.p.m. imparted to the respective crank 13 for the paired legs 31. In manually powered or driven devices, turning can, likewise, be effectuated by regulating the force and direction of force applied to pedals or crank handles $29_p$. In the depicted device of FIG. 14, the rear walking assembly is articulated at articulating joint 30 so as to permit articulation of the rearward assembly when turning. By articulation and trailering of the rear unit 1, effective turning simply by varying the speed of the front driving assemblies $1_C$ and $1_D$ may be achieved.

With particular reference to the motorized walking device 8' as depicted in FIG. 15, each of the paired leg walking assemblies $1_C$, $1_D$ and $1_E$ are equipped with a battery operated variable speed motor $29_m$ connected to control box $29_b$, which, in turn, is powered by battery $29_e$. In FIG. 15, the variable speed motors $29_m$ are operatively connected to drive sprockets $29_s$, which transfer the rotational movement to drive belts $29_r$, which, in turn, power sprockets $29_o$ which are axially linked to the drive shafts (occluded from view) for turning crank shafts 15. Joystick $29_j$ operatively associated with control box $29_b$ allows the speeds of the motors to be varied by directional movement of joystick $29_j$. For example, a straight forward movement may be utilized to effectuate a straight movement joystick $29_j$ whereas a slanted forward movement would effectuate a slowing of one motor in the direction in which joystick $29_j$ is slanted while the opposite laterally disposed motor $29_m$ would be operationally operating at a faster speed or r.p.m. so as to effectuate the turn. Instead of manually controlled joystick $29_j$, the device 1 may be remotely controlled (e.g. via radio) so as to allow an unmanned walking device 1 to traverse rugged terrain including terrain which is normally impassable or difficult to traverse with wheeled or tracked vehicles.

Other conventional means for turning wheeled vehicles may be effectively adapted to multiple legged vehicles of the present invention. For example, crank shafts, cranks, hydrostatic drive systems or drive sprockets may be individually fitted with braking systems so as to impede the speed of one or more walking assemblies 1 when a turn is being effectuated by the operator.

FIG. 16 is a side elevational view of the two legged walking assembly 1 of FIG. 11 fitted with axially or pivotally mounted shoes $35_s$. An off-set axle at mount $33_r$ shoe $33_s$ to foot 33 places the shoe $33_s$ center of gravity towards shoe heel section $33_h$ allowing the toe section $33_t$ to gravitationally pivot upwardly when foot 33 and shoe $33_s$ are lifted from the surface or ground. Spring actuated, hydraulic actuated, or other mechanical means for tipping the top section $33_t$ upwardly may be used to place shoe $33_s$ in the appropriate toe and heel position for walking or running. The faster foot movements may be facilitated by mechanical aides for expeditious positioning the toe and heel in the proper stride position. Similar to a human foot, shoe $33_s$ increases base surface area coverage of the grounded foot 33 thereby stabilizing the walking assembly 1 against tipping. Increased surface area coverage importantly allows the walking device 1 to walk across soft, non-firm, uneven, displaceable, dispersible, etc. surfaces (e.g. mud, snow, sand, grass, etc.) which are most difficult to traverse with conventional wheeled devices. Other conventional means for stabilizing the walking device 1 against tipping (e.g. inertia systems, lowering center of gravity, weight shifting systems, gyroscopic means, stabilizing arms, etc.) may be utilized to stabilize the lesser legged walking assemblies 1 against tipping.

FIGS. 18 and 19 respectively depict an elevational isometric view and a side elevational view of a motorized walking chair (generally designated as 1) embodying the motorized and pivoting foot embodiments of the walking device 10 as depicted FIG. 15. The walking chair device 10 includes four paired leg walking assemblies ($1_A$, $1_B$, $1_C$, $1_D$) powered by four battery-powered, variable-speed motors $29_m$ operatively connected to control box $29_b$ which, in turn, is powered by a suitable battery source (not shown). The walking chair device 10 is similar to a wheelchair except for the replacement of conventional wheels with the four walking assemblies $1_A$, $1_B$, $1_C$ and $1_D$.

Similar to the walking device 8 as shown in FIG. 15, four variable speed motors $29_m$ are used to separately power each of the walking assemblies $1_A$, $1_B$, $1_C$ and $1_D$ as shown in FIGS. 18–19. Conventional drive means, such as shaft, pinion, and spur gears, belts, chain drives, variable clutch systems, etc., may be appropriately utilized to transfer power to crank shaft 15. As mentioned before, movement of joystick $29_j$ in cooperative combination with control box $29_b$ allows the speeds of the motors to be varied by the directional movement of joystick $29_j$ in a conventional manner.

The legs 31 of the walking chair device 10 are fitted with pivotally mounted feet 33 which enhance the traction and stability of the walking device 10. Similar to the construction of wheeled wheelchairs, the rear walking assemblies ($1_C$ and $1_D$) are pivotally mounted to frame 3, whereas the forward walking assemblies $1_A$ and $1_B$ are rigidly affixed to the bottom front base of frame 3".

Similar to other depicted walking devices, the walking wheelchair device includes reciprocating legs 31 equipped with feet 33, a hip joint 37 opposite from the foot 33, a centrally disposed knee joint 35, a first rocker arm 5 axially connected at one end of the rocker arm 5 to the hip joint 37 and axially connected to frame 3" by first rocker arm axle 9 at an opposite arm end, and a connecting rod 21 equipped with a knee coupling mount $35_c$ (e.g., such as shown in FIG. 10) at the distal connecting rod end for operationally connecting rod 21 to knee joint 35.

Similar to the other walking devices mentioned above, a crank connecting rod mount $17_c$ (e.g., such as shown in FIG. 10) at the proximate end of the connecting rod and elbow joint connecting site 27 (e.g., such as depicted in FIG. 10) laterally positioned between said knee coupling mount connecting rod $35_c$ (e.g., such as shown in FIG. 10) and the crank connecting rod mount $17_c$ (e.g., such as shown in FIG. 10) and also a second rocker arm 7 axially connected to the elbow joint 27 (e.g., refer to FIG. 10) at the first end of the second rocker arm 7 and axially mounted to frame 3 by a second rocker arm axle 11 (e.g., refer to FIG. 10) at a second rocker arm end, and a crank 13 axially mounted to the frame 3 by crank shaft 15 (e.g., refer to FIG. 10 for corresponding shaft) which, in turn, is operatively connected to locomoting means (generally referenced as 29 in the FIGS.) provides power to crank 13. A crank pin 17 of crank 13 is axially connected to connecting rod mount $17_c$ (e.g., again refer to FIG. 10) at a distal connecting rod end or power input end of connecting rod 21.

Chair 90 is integrated into the frame 3 structure so as to provide seating for an occupant. Chair 90 is equipped with a backrest 92, seat 94, armrests 96 and a foot rest 98 with joystick $29_j$ and its associated control box $29_b$ being conveniently mounted to the right side armrest 96.

The side-elevational view of FIG. 19 shows in greater detail the cooperative relationship between walking assemblies $1_C$ and $1_D$. The remaining components as designated in FIGS. 18 and 19 bear a corresponding relationship to those component parts as disclosed in FIGS. 1–16 with the exception of the particular placement of the walking assemblies $1_A$, $1_B$, $1_C$ and $1_D$. The walking device 10 has a particular advantage over the wheeled wheelchairs in that the walking chair device 10 as illustrated in FIGS. 18 and 19, has a unique ability to effectively traverse vertical obstructions such as curbs, steps, etc. The walking device 10 effectively traverses unprepared, tough, obstructed and uneven surfaces, thus, substantially increasing the range of locations inaccessible to conventional wheelchairs.

The walking device 1 of this invention uniquely allows frame 3 and foot 33 to traverse the ground in a substantially parallel elevational relationship. Similar to an automobile with wheels traversing the surface in which the axles remain in parallel alignment to the surface being traversed by the vehicle, the walking device 1 of this invention permits the frame 3 to maintain its parallel relationship to the ground as it traverses the ground. This is basically accomplished by the cooperative arrangement of the working components which transform motion into a curvilinear and substantially linear orbital pathway of the grounded foot 33 as provided by this walking device 1. When the foot 33 is in the grounded forward stride position, foot 33 moves backwardly in a substantially linear path so that the frame will maintain its substantially parallel relationship to the ground while foot 31 traverses to the ground from the beginning of its stride to the ending of the stride. Upon completion of the stride, the foot 33 transforms the orbital and reciprocating motion into a curvilinear pathway so that the foot 33 may be appropriately lifted to the stepping height. The step height of the gait may be varied by the selection of the various points which are utilized for the various axial points and linkages for the walking device 1. The walking device 1 as depicted in FIGS. 1–16 are designed so as to have a maximum step height amounting to 0.5424 or 54.24% of its stride length. In other words, the foot 33 is lifted slightly more than ½ of the stride length. This allows the leg 33 and device 1 to clear obstacles which may be approximately 54% of the stride length. The stride elevation and stride length may be altered by modifying the cooperative arrangement of the stride regulating features of the invention. For faster moving devices 1, a lower stride elevation than depicted facilitates operational speed of the device 1.

The walking device 1 of this invention may be utilized in any machine adapted to traverse over ground surfaces. The walking device 1 may be, accordingly, utilized in those applications conventionally relying upon wheels or tracks. The walking device 1 of this invention has definitive advantages over wheeled and tracked devices in that similar to the legs of animals, it possesses an ability to step over obstacles (e.g. steps, curbs, mud, snow, sand, etc.) rather than rolling through or around obstacles. Consequently, the walking device 1 is capable of traversing terrains in which conventional tracked or wheeled objects could not traverse or would be difficult to traverse. Unlike wheeled devices, there exist no rolling friction between legs 31 and the surface. Unlike wheeled and tracked devices, the walking device 1 of this invention does not leave a continuous track or pathway, but rather similar to legged animals, it leaves footprints. Unlike conventional wheeled or tracked devices, the present device 1 can be adapted to effectively navigate steps and stairs. Also, similar to animal tracking, the walking device 1 of this invention is capable of doing less damage to the terrain than wheeled or tracked vehicles. It is also capable of undergoing delicate or tight maneuvers which cannot be effectively accomplished with wheeled or tracked vehicles.

Illustrative uses for the present walking device 1 include manned and unmanned vehicles. As previously mentioned, the legged vehicles may be motorized or manually powered. Exemplary adaptations of the present walking device 1 include those presently provided by motorized transporting vehicles for family, industrial, agriculture and recreational purposes; human powered vehicles and cycles; wheelchairs; autonomous vehicles; remote-controlled vehicles; all-terrain vehicles; walking devices for disabled animals such as paraplegics, bicycles, tricycles; legged replacements for wheeled and tracked toys; imitation or toy animals; animated cartoon characters; mobile units and the like.

The length between the axial mounts of the various components of the walking device 1 and their respective spatial relationship have a direct bearing upon the orbital movement of the foot 33 or stride of walking device 1. As typified by the single legged walking device shown in FIGS. 1–10, if it is desired to create a walking device 1 having a grounded stride measuring one unit (e.g. such a unit may be in any unit size such as inches, foot, yards, meters, etc.) and a vertical stride lift (elevation) of 0.5424 unit (i.e. of stride length), the following unit distances between the axle mounts and positioning of axle mounts may be used to construct such a walking device 1. The distances between the respective axle sites and axle positioning have a direct bearing upon the orbital movement of the foot. Similarly, by increasing the dimensional size of the components the orbital movement of foot 33 will correspondingly increase. In constructing such a device, the frame may be suitably constructed of a triangular frame for supporting axle frame mounts $11_m$, $9_m$ and $15_m$ having a leg side (front) measuring 0.8017 unit from the center point of second rocker arm mount $11_m$ to first rocker arm mount $9_m$) a rear triangle side measuring 0.5848 unit from the center of first rocker arm bushing mount $9_m$ to crank axle mount $15_m$ and a base triangle side (bottom) measurement between the rocker arm bushing mount $11_m$ and crank axle bushing mount $15_m$ of 0.6168 unit. A leg measuring approximately two units bent at the knee so as to form 150° angular bend (as measured from the rear of the bent leg) may be effectively utilized in constructing a suitable leg for the walking device 1 as shown in FIGS. 1–10. The distance measures 0.896575 unit length between its axial knee mount $35_m$, to its axial connection to hip joint mount $37_m$ of leg 31. The distance from the base of foot 33 to hip joint mount $37_m$ measures 1.7320 (straight lineal) units. The axial centering points between first rocker mount $9_c$ to the hip mount $37_c$ of the first rocker arm 5 measures 0.517638 units. The distance between the knee 35 coordinate to the center point of foot 33 measures 0.8966 units. The distance between the axial center of crank rod connection $17_c$ to elbow connecting site $27_c$ center measures 0.3236 units. In the second rocker, the centering distance between elbow connecting site $27_c$ and the second rocker mount $11_c$ measures 0.32357 units. The centering distance between crank rod connecting mount $17_c$ of connecting rod 21 and knee coupling mount $35_c$ of connecting rod 21 measures 1.0991 units. The centering distance between the crank connecting mount $17_m$ and crank shaft 15 mount measures 0.267949 units. The centering distance between axial knee mount $35_m$ to elbow joint $27_c$ measures 0.510412 units.

When mounting the walking device 1 as depicted in the figures, the distance between frame 3 and the surface of a fully grounded foot 33 should be sufficient so as to provide a positioning of the linkages so as to optimize the linear pathway of the foot 33. This may be accomplished in the above dimensionally described device 1 by positioning the second rocker arm axle mount $11_m$ at an elevation of 0.7106 units above the pathway and the crank axle bushing mount $15_m$ at an elevation of 0.8920 units above the pathway.

The walking device 1 having the characteristics as defined in immediately above paragraphs when, as described above, are assembled together as shown in FIGS. 1–10 will provide a single legged walking unit 1 having grounded a stride measuring one unit and an inherent ability to lift the foot upwardly and forwardly 0.5424 unit at its highest elevational point, which point occurs at approximately a 284° rotational position of the crank rod 17. As commonly understood, these units may be given any prescribed value such as in inches, feet, meters, etc. so long as they bear the unitary relationship as mentioned herein. Thus, the walking device 1 having the aforementioned dimensional and positional alignments will have the walking characteristics as defined immediately above.

The unitary sized links and their respective planar geometric placement in providing walking device 1 may be computed mathematically or by the plotting from geometric configurations. FIG. 17 illustrates a geometric representation for plotting or determining suitable axial coordinates for constructing the walking device 1.

In the geometric determination, the length of the stride is selected as one unit and is represented by a horizontal line segment or chord $50_s$. The left endpoint $33_x$ of this line segment $50_s$ represents the foot 33 when the device 1 is fully extended in the grounded stride position as shown in FIG. 1. The other endpoint $33_y$ represents the foot 33 at the end of the grounded gaited position as shown in FIG. 3. A line $51_n$ is drawn perpendicular to and centered on line $50_s$ to provide a bisecting perpendicular line $51_n$. Point $52_p$ is located on this line (FIG. 17 shows $52_p$ being 0.8660 units above $50_s$). For a different unit and foot pattern point $52_p$ may be repositioned along line $51_s$. A circle $53_c$ centered at $52_p$ is then drawn. The radius of the circle $53_c$ is greater than one-half the stride length. As may be measured, circle $53_c$ in FIG. 17 has a radius of one unit. Point $62_p$ is located at the radian intersection of line $51_n$ and circle $53_c$. A vertical line $54_s$ perpendicular to line $50_s$ is drawn from point $33_x$. Another perpendicular line $55_s$ to line $50_s$ is drawn from point $33_y$. The intersections of parallel lines $54_s$ and $55_s$ and the upper half of circle $53_c$ form points $56_p$ and $57_p$ respectively.

Point 9 may be positioned on circle $53_c$ to the right of $55_s$ or to the left of $54_s$. For illustrative purposes, point 9 is shown as being located on radian $53_c$ of circle $53_c$ 60° to the right of vertical intercept of line $51_n$ on circle $53_c$ in FIG. 17. Point 9 represents a suitable mounting position for axle mount $9_m$ of upper rocker arm 5 to frame 3. Three lines are drawn from point 9 to points $56_p$, $62_p$ and $57_p$ which are labeled $58_s$, $59_s$ and $60_s$ respectively. Line $61_s$ is drawn from point $33_x$ to point $62_p$. The angle $63_a$ between line $51_n$ and line $61_s$ as shown in FIG. 17 is measured. A line $64_s$ is drawn from point $62_p$ so that angle $63_a$ is recreated as $63_a$ between $64_s$ and $59_s$. Point $37_x$ is located at the intersection of lines $64_s$ and $58_s$. Point $37_y$ is located on line $60_s$ the same distance from point 9 as the distance between point $37_x$ and point 9 (points $37_y$ and $57_p$ coincide in FIG. 17).

Point $65_p$ is located on the lower portion of circle $53_c$ (FIG. 17 shows point $65_p$ directly beneath point $52_p$). Three lines are drawn from $65_p$ to points $56_p$, $62_p$ and $57_p$, which lines are labeled $66_s$, $67_s$ and $68_s$ respectively. It should be noted that lines $51_n$ and $67_s$ coincide in FIG. 17. A line $69_s$ is drawn from point $62_p$ so that angle $63_a$ is recreated as $63_a$"between $69_s$ and $67_s$ (note lines $69_s$ and $61_s$ also coincide in FIG. 17). Point $35_x$ is located at the intersection of lines $66_s$ and $69_s$. Point $35_y$ is located on line $68_s$ the same distance from point $65_p$ as the distance between points $35_x$ and $65_p$.

A line $70_s$ is then drawn from point $35_x$ to point $35_w$. The intersection of line $70_s$ and $67_s$ form point $71_p$ (points $71_p$ and $52_p$ coincide in FIG. 17). Point $72_p$ is located on line $67_s$ the same distance from point $65_p$ as the distance between points $35_x$ and $65_p$. A lines $73_s$ is drawn perpendicular to line $67_s$ midway between points $71_p$ and $72_p$. Point $74_p$ is located at the intersection of lines $67_s$ and $73_s$. Point $75_p$ is located on line $73_s$ (the distance between points $74_p$ and $75_p$ in FIG. 17 is 1.0986 units).

A line segment $76_s$ with the length of one-quarter of the length of line $70_s$ is then drawn perpendicular to line $73_s$ and on the downward side of $73_s$ at point $75_p$. The end point of line $76_s$ opposite point $75_p$ is labeled point 15 which identifies the axle location or crank shaft mount $15_m$ on frame 3 for crank shaft 15. A line segment $77_s$ having the same length as line $76_s$ is then drawn perpendicular to line $73_s$ at point $75_p$ on the upward side of line $73_s$. The endpoint of line $77_s$ opposite point $75_p$ is labeled $78_p$. A line $79_s$ is then drawn parallel to line $73_s$ that passes through point 15. Point $29_y$ is located on line $79_s$ on the opposite side of line $76_s$ as line $67_s$ which is at a distance from point 15 equal to one-half the length of line segment $70_s$. Point $29_x$ is located on line $79_s$ on the opposite side of point 15 as point $29_y$ at a distance from point 15 equal to one-half the length of line segment $70_s$.

Point $27_x$ is located on line $79_s$ (FIG. 17 uses a distance of 0.5895 units between points $29_x$ and $27_x$). Point $27_y$ is located on line $79_s$ the same distance from point $29_x$ as the distance between points $27_x$ and $29_x$. Point $80_p$ is located at a point that is the same distance from point $72_p$ as the distance between points $35_x$ and $27_x$, and the same distance from point $78_p$ as the distance between points $27_x$ and $29_x$. A line $81_s$ is drawn from point $27_x$ to point $80_p$. A line $82_s$ is drawn from point $80_p$ to point $27_y$. A line $83_s$ is drawn perpendicular to line $81_s$ midway between points $27_x$ and $80_p$. A line $84_s$ is then drawn perpendicular to $82_s$ midway between points $80_p$ and $27_y$. The intersection of lines $83_s$ and $84_s$ at point 11 identifies the location of the second rocker arm axle mount $11_m$ to frame 3.

The geometric depiction of FIG. 17 also identifies the placement and orbital pathway of crank rod or pin 17 (shown as power source 29) in the fully extended position $29_x$ or retracted ground stride position $29_y$, the knee joint 35 in the extended $35_x$ and retracted position $35_y$, the extended hip joint $37_x$ and retracted hip joint $37_y$, and the elbow joint 27 as extended $27_x$ and retracted $27_y$. Measurements for the appropriate linkages may be measured from the appropriate linking points of FIG. 17.

The following Table 1 sets forth the coordinates for the points shown in FIG. 17:

TABLE 1

|  | X | Y |
|---|---|---|
| 9 | 1.366 | 1.366 |
| 11 | 1.009 | 0.574 |

TABLE 1-continued

|  | X | Y |
|---|---|---|
| 15 | 1.599 | 0.750 |
| 27X | 0.741 | 0.750 |
| 27Y | 1.277 | 0.750 |
| 29x | 1.331 | 0.750 |
| 29y | 1.867 | 0.750 |
| 33x | 0.000 | 0.000 |
| 33y | 1.000 | 0.000 |
| 35x | 0.232 | 0.866 |
| 35y | 0.768 | 0.866 |
| 37x | 0.866 | 1.500 |
| 37y | 1.000 | 1.732 |
| 52p | 0.500 | 0.866 |
| 56p | 0.000 | 1.732 |
| 57p | 1.000 | 1.732 |
| 62p | 0.500 | 1.866 |
| 65p | 0.500 | −0.134 |
| 72p | 0.500 | 0.901 |
| 78p | 1.599 | 1.018 |
| 80P | 1.022 | 0.894 |

As evident from the aforementioned, the positioning of $52_p$ (center point) may be adjusted upwardly or downwardly along line $51_n$ which, in turn, will alter the placement of the coordinates of FIG. 17. FIG. 17 shows how the device 1 having the particular characteristics as defined in a preferred embodiment of the invention may be constructed. By changing the configuration of the stride and its placement, a completely different set of suitable coordinates may be derived using the determined methodology as described above. The dimensions and positional placement for the pivotal coordinates of device 1 may also be calculated from Table 1 by using the Pythagorean Theorem.

In the walking chair device 10 as depicted in FIGS. 18 and 19, it is desirable to design the linkages to permit device 10 to step onto the curb while still maintaining a profile low enough to clear seat 94. The step height for the walking chair 10, as shown in FIGS. 18 and 19 is set at 7.5 inches, the stride length at 12 inches and the deviation from linear of +/−0.33 inches.

The linkages, as shown in FIGS. 18 and 19, are proportioned differently than those of FIGS. 1–16 as described in Table 1. The four sets of legs ($1_A$, $1_B$, $1_C$ and $1_D$) on the walking chair 10, as shown in FIGS. 18 and 19, are dimensioned in inches using a standard Cartesian coordinate system with location $33_x$ as the origin as tabulated in Table 2. The rear two sets of legs $1_B$ and $1_D$ are shown in a forward motion position with the extended foot as the most rearward point. The rear two sets of legs ($1_B$ and $1_D$) swivel about a vertical axis which is in alignment with the second rocker arm axle 11. The distance between locations $33_x$ on the front and rear sets of legs in FIGS. 18 and 19 is set at 60 inches so as to provide a balanced stability regardless of the direction of travel.

The walking device chair 10 linkages may be defined using the coordinates of Table 2 which tabulates the pivot points for the FIGS. 18 and 19 walking chair 10:

TABLE 2

|  | X | Y |
|---|---|---|
| 9 | 17.818 | 16.076 |
| 11 | 12.101 | 10.186 |
| 15 | 17.607 | 11.807 |
| 27X | 9.125 | 11.807 |
| 27Y | 15.077 | 11.807 |

TABLE 2-continued

| | X | Y |
|---|---|---|
| 29X | 14.631 | 11.807 |
| 29Y | 20.583 | 11.807 |
| 33x | 0.000 | 0.000 |
| 33y | 12.000 | 0.000 |
| 35x | 3.024 | 13.099 |
| 35y | 8.976 | 13.099 |
| 37x | 11.119 | 19.200 |
| 37y | 13.578 | 22.130 |
| 52p | 6.000 | 13.992 |
| 56p | 0.000 | 24.384 |
| 57p | 12.000 | 24.384 |
| 62p | 6.000 | 25.992 |
| 65p | 6.000 | 1.992 |
| 72p | 6.000 | 13.491 |
| 78p | 17.607 | 14.783 |
| 80P | 12.236 | 13.572 |

In the figures depicting the walking device, the various component parts are enumerated with a corresponding number in each of the figures so as to provide consistency in the depicted components from one walking device to another. In certain of the figures, such as in FIGS. 10–11, 14–16 and 18–19 similar components have enumerated the same but with different alphabetical indexing in order to explain in more detail how similar component parts relate to one another in the walking device.

The present invention uniquely departs from prior legged devices by arcuate means of controlling motion of both the elbow joint 27 and the hip joint 37 as leg 31 is propelled throughout its gaited stride. The first and second rocker arms 5 and 7 depicted via FIGS. 1–19 of leg 31 restrict the movement of both joints (27 and 37) to a constant repetitive arcuate pathway. This enables leg 31 to more accurately simulate the gait of a legged animal. The embodiment of the invention, as illustrated by FIGS. 20–34, replace at least one of the rocker arms (5 and 7) with an arcuate joint guide (generally designated by a 100 series number) which as the rocker arms (5 and 7) restricts movement of the joints (27 and 37) to a repetitive reciprocating arcuate movement.

This other embodiment of the invention as depicted by FIGS. 20–35 shows the use of at least one arcuate guide (101 and/or 103) of leg 31 to control movement of either the hip joint 37 or the elbow joint 27 (e.g. elbow joint) or both. The use of at least one arcuate guide 100 for each leg 31 is depicted by FIGS. 20–35 of which FIGS. 20–26 show a combination of an arcuate elbow guide 103 and a first rocker arm 5. The walking gaits of FIGS. 20–26 and 27–33 are of an ordered sequence which correspondingly reflect the corresponding gaited leg movements of FIGS. 1–6, (e.g. gait of FIGS. 1 and 2 respectively correspond to FIGS. 20 and 21, as well as FIGS. 27 and 28).

The embodiment of the invention shown in FIGS. 27–33 depict the replacement of the first rocker arm 5 and the second rocker arm 7 of FIGS. 1–6 with two arcuate guides shown as a hip arcuate guide 101 and an elbow arcuate guide 103. It will be observed in FIGS. 27–33 that instead of a first rocker arm 5 and a second rocker arm 7, an upper arcuate hip guide 101 carried by frame 3 controls the movement of hip joint 37, while the movement of elbow joint 27 is regulated by a lower arcuate elbow guide 103 also carried by frame 3. Contrastingly, FIGS. 1–19 show orbital motion of the hip joint 37 being regulated by a first rocker arm 5, while a correspondingly orbital motion of the knee joint 35 is depicted as being regulated by second rocker arm 7.

FIGS. 20–26 depict an embodiment of the invention relying upon a combination of an elbow joint 27 regulated by arcuate elbow guide 103 and hip joint 35 controlled by an upper rocker arm 5 as also depicted in FIGS. 1–6. In the embodiments of the invention as shown in FIGS. 27–33, the first rocker arm 5 of FIGS. 1–6 has been replaced with an arcuate hip guide 101, while the second rocker arm 7 of FIGS. 1–6 has been replaced with lower arcuate elbow guide 103, both of which serve to limit the orbital motion of the knee joint 35 and hip joint 37 as leg 31 is propelled throughout its gaited motion powered by connecting rod 21 and crank rod 13. If the reciprocating motion of the hip joint 37 and the elbow joint 27 were to be superimposed onto frame 3, a tracing of the superimposed reciprocating motion thereof upon frame 3 would reflect the configuration of a replicating arcuate hip guide 101 and a replicating arcuate elbow guide 103. Such an arcuate guide configuration replaces the corresponding function of the first and second rocker arms (5 and 7).

As may be observed from FIGS. 27–33, the arcuate guides 101 and 103 for hip joint 37 and elbow joint 27 may comprise arcuate slots 101 and 103 cut from frame 3 so as to correspondingly reflect the arcuate motions of knee joint 35 and elbow joint 27 throughout the gaited cyclic steps as illustrated by FIGS. 1–6. Referring to FIGS. 20–26, hip axle $37_a$ (with or without hip axle bushing $37_b$) may be correspondingly seated onto arcuate pathway of slotted hip guide member 101. As may be further observed by a comparison of FIGS. 1–6 and FIGS. 27–33, frame 3 may be appropriately extended so as to provide adequate space for the slotted pathway 101 for hip axle $37_a$ which allows for the simulation of the arcuate pathway of hip joint 37 within the confines of the arcuate hip guide 101 of frame 3. The motion of leg 31 as depicted in FIGS. 1–6 and FIGS. 27–32 is the same; only the means for controlling the respective motion of the hip joint 35 and elbow joint 27 has been changed. In a similar fashion, the arcuate elbow guide 103 shown in FIGS. 27–33, as well as FIGS. 20–26, serves as a replacement for the second rocker arm 7 of FIGS. 1–6.

In the sliding joint embodiments of FIGS. 20–26, the elbow axle $27_a$ is seated onto arcuate elbow guide 103 which, in turn, regulates the arcuate movement of elbow joint 27 in the same manner in which the second rocker arm 7 control the same movement shown in FIGS. 1–6.

The hip joint 37 of FIGS. 20–26 relies upon the first rocker arm 5 to control the reciprocating arcuate movement of guide axle $37_a$. Thus, in the embodiments of the invention, as disclosed in FIGS. 27–33, the function of the first and second rocker arms 5 and 7 is replaced with a pair of arcuate guides 101 and 103 which correspondingly constrain the movements of the hip joint 37 and the knee joint 35 via elbow joint 27 so as to permit leg 31 to simulate the walking gait of an animal. By controlling the orbital movement of the knee 37 and hip 35 joints herein, the gait of the forwarding moving leg 31 is regulated so that it closely simulates that of a walking animal.

It should be self-evident from the aforementioned that if desired, the elbow joint 27 of FIGS. 27–33 could be controlled by the second rocker arm, as shown in FIGS. 1–6, while the upper rocker arm 5 therein could be replaced with the arcuate hip guide 101, as illustrated by FIGS. 27–33. The walking device 1, as depicted by FIGS. 20–35 all embody leg 31 in which at least one arcuate guide (e.g. 101 and/or 103) is used to regulate the orbital movement of leg 31.

Irrespective of which mode of control is utilized, the gait of leg 31 is controlled by controlling the arcuate movement of the elbow joint 27 and the hip joint 37. The walking motion of the hip and knee joints may be accordingly controlled through use of a pair of rocker arms 5 and 7 or a pair of arcuate guides (101 and 103), or a combination of a rocker arm (hip 37 or elbow 27) and an arcuate guide 100 for the other remaining joint. The rocker arms 5 and 7 are more durable and, therefore, preferred for those applications requiring a more durable construction. For lightweight applications such as toys, the arcuate guide system serves as a suitable replacement.

As mentioned above, the rocker arm axial connections of the first rocker arm 5 and the second rocker arm 7 are geometrically positioned and mounted upon frame 3 so as to provide a walking device generating a desired orbital pathway or stride. In the same manner, the arcuate elbow guide 103 and arcuate elbow guide 101 when present for respectively guiding elbow axle $27_a$ and hip axle $37_a$ similarly provide the necessary arcuate pathways for regulating the geometric movements of the hip and knee joints in the same manner as the first and second rocker arms (5 and 7) serve in FIGS. 1–19.

Figure 33:
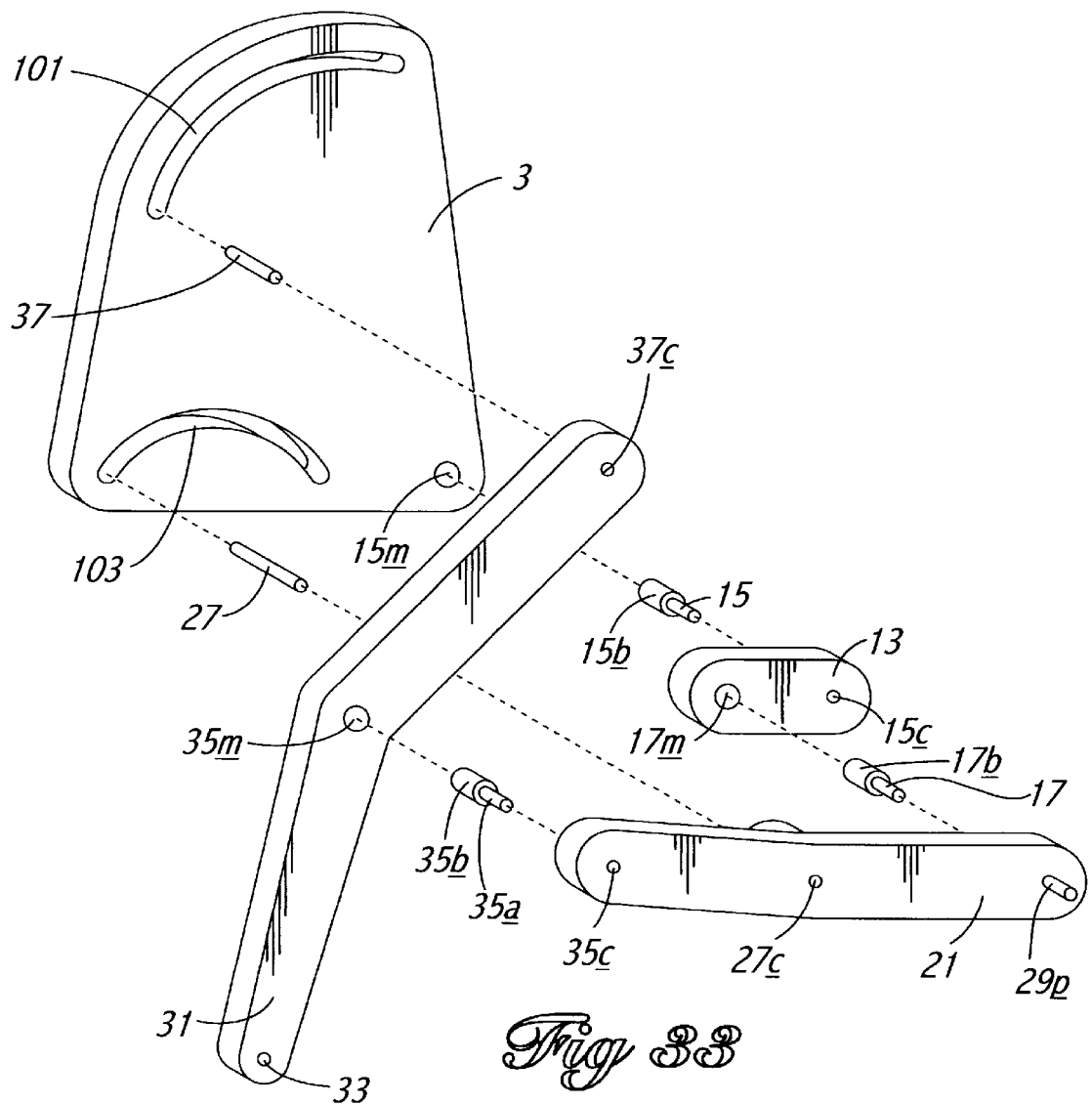
FIG. 33 is an exploded side view of the component parts shown in FIG. 27.

The exploded view of FIG. 33 depicts how the hip axle $37_a$ when seated in arcuate hip guide 101 allows the hip joint 37 to undergo an arcuate pathway similar to an actual hip in movement. Similarly, the elbow axle $27_a$ seated in arcuate elbow guide 103 provides an arcuate pathway for simulating the knee joint of an animal leg in motion. The net effect is a systematic, repetitive control of the hip 37 and knee 27 movements of leg 31 so as to create a repetitive stride simulating a gait of a walking animal.

Figure 34:
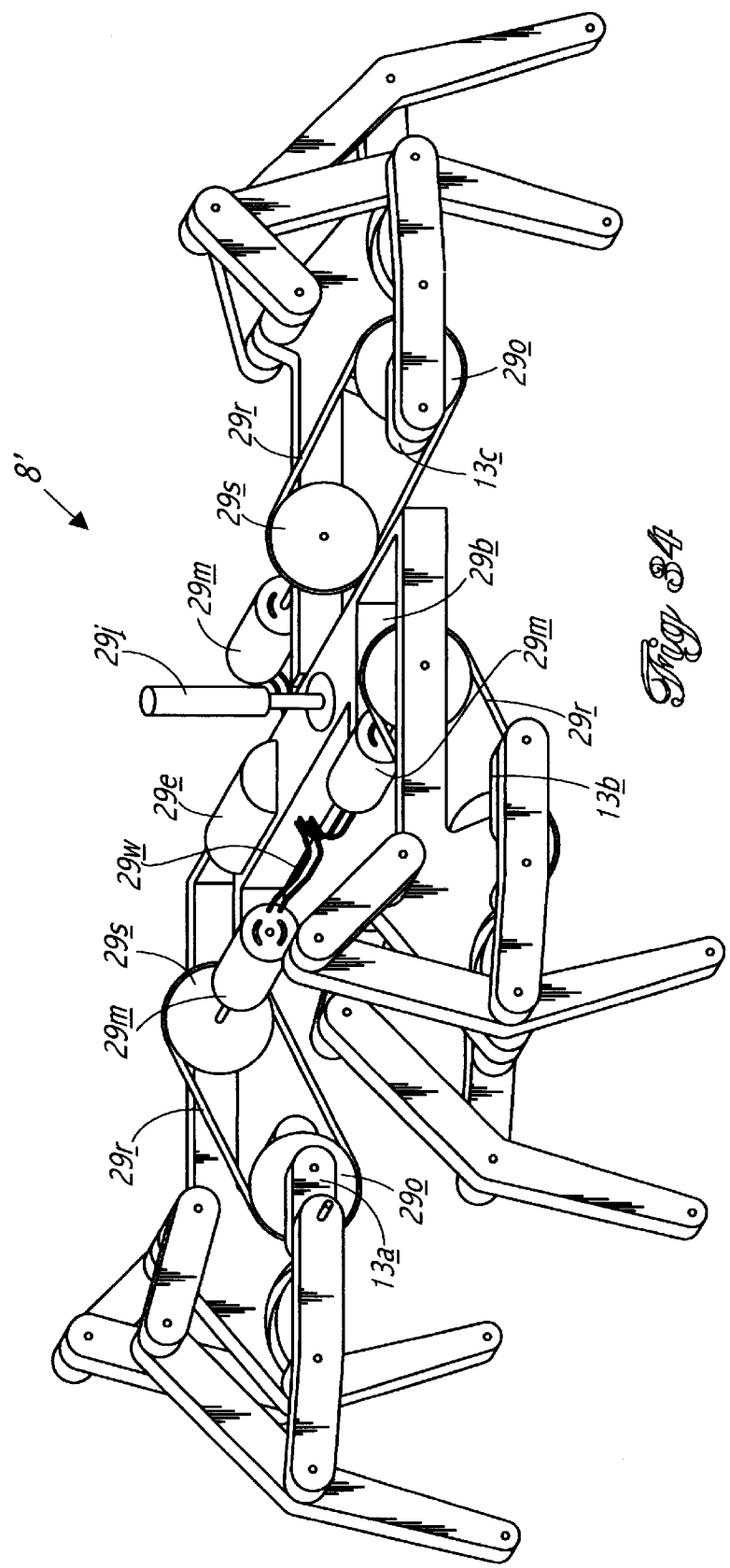
FIG. 34 depicts a motorized version of the walking device shown in FIG. 15 with the knee joints therein being guided by an arcuate knee guide instead of a second rocker arm.

FIG. 34 illustrates the adaptation of the arcuate elbow guides 103 as replacements for the second rocker arm 7 embodiments of the motorized version of the walking device 1 shown in FIG. 15. The FIG. 34 walking device 1 performs a similar walking gait as the FIG. 15 walking device.

Since the reciprocating arcuate pathway of the hip joints 37 and the elbow joints 27 control the characteristics of the walking gait, it is possible through the application of arcuate pathways of differing radii to alter the gait while leg 31 is in motion. The ability to alter the gait may be helpful for use in a walking device 1 which is designed to alter its gait in order to traverse obstacles (e.g. abrupt elevation such as projecting objects or stairs) within the pathway of leg 31. This may be accomplished by varying the radii of the arcuate pathway of hip 37 and elbow 27 joints. Hydraulically or pneumatically controlled telescoping cylindered pistons (manually or automatically regulated via electronic or mechanical controls) may be adapted to the first rocker arm 5 and the second rocker arm 7 to alter the radius of the arcuate pathways and therefore alter the stepping gait of leg 31. Similarly, arcuate guides 100 constructed so as to allow for variable radii (e.g. conformable guides, flighted guides with shifting means to shift to the different radial distances, etc.) may be used for changing the radial configuration of the arcuate guides (101 and 103) and therefore alter the gait.

Figure 35:
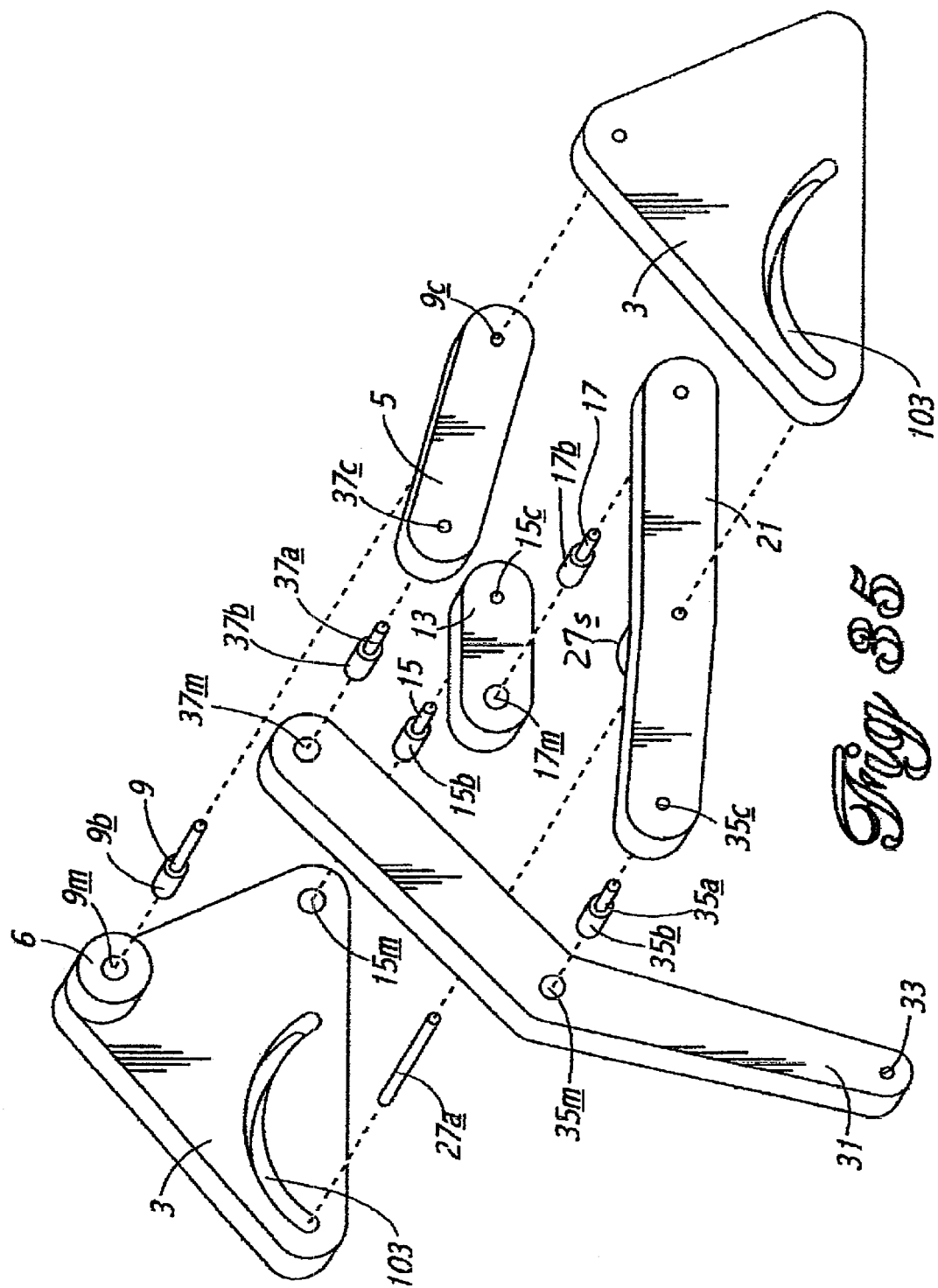
FIG. 35 depicts an exploded elevational view of a modification of the device shown in FIGS. 20–26.

The exploded elevational side view of FIG. 35 reveals a modification of the legged device 1 shown in FIGS. 20–26 relying upon the sandwiching of the legged components between mating frames 3 provided with matching arcuate elbow guides 103 within which an extended elbow axle $27_a$ bridges between and follows along the arcuate elbow guide pathway when leg 31 is in motion. An elbow axle spacer $27_s$ provides a spacing clearance between connecting arm 21 and left frame 3 for leg 31 to reciprocate along guides 103 as connecting rod 27 is powered by crank 13. By the utilization of two frames 3 equipped with the arcuate elbow guides 103 and an extended elbow axle $27_a$ to seat within both arcuate elbow guides 103, the bending forces against elbow axle $27_a$ are eliminated leaving only the shear forces to act thereupon. The double frame 3 structure with the sandwiching of leg 31 and connecting arm 21 with elbow axle 27 sliding along the channel provided by the mating arcuate elbow guides 103 significantly enhances the durability of the sliding joint walking devices 1 of FIGS. 20–35. The double frame 3 construction may also be used with the arcuate hip guide 101. In the paired combination of legs such as shown in FIG. 16, a three frame 3 structure may be used with each leg 31 being sandwiched between an outer frame 3 and a single inner frame, all provided with the necessary arcuate guides 101 and 103.

It should be self evident that the single legged depictions of FIGS. 20–33 and 35 apply equally to the multiple legged device 1 of FIGS. 10–16 and 18–19. Except for the modification created by the sliding joint embodiments (i.e. the arcuate guides 101 and 103) of FIGS. 20–35 the numerical references used to identify the component parts in all the figures remain the same so as to provide a clearer understanding of the working components in all of the walking devices 1.

In the claims of this continuation-in-part patent application, the claims have been drafted in a Jepson claim form so as to provide an appropriate format for avoiding a double patent rejection of the present claims over the claims of my other patent applications. Accordingly, this claim format provides a convenient format for distinguishing the claimed subject matter of this application from the claimed subject of my other patent applications. The claim form as used herein accordingly does not constitute an implied admission that the preamble portion of the claim may be treated as prior art.

What is claimed is:

1. In a walking device for simulating a walking step of an animal comprising a frame having a first rocker arm mount, a second rocker arm mount and a crank mount seated onto the frame; a leg having a foot end, a centrally disposed knee joint and a hip joint at an opposite leg end from said foot end; a first rocker arm axially connected at one rocker arm end to the hip joint and axially mounted to the first rocker arm mount at an opposite rocker arm end; a connecting arm having a knee coupling mount at a distal connecting arm end for operationally connecting the connecting arm to the knee joint, a crank rod connecting site at a proximate end of the connecting arm and an elbow joint connecting site positioned between said knee coupling mount and said crank rod connecting site; a second rocker arm axially coupled to the elbow joint connection site at a first end of the second rocker arm and axially mounted to the second rocker arm mount at a second end; and a crank axially mounted to the crank mount for revolutionary motion about the crank mount at one crank end and connected to a crank rod at the crank rod connecting site of the connecting arm at an opposing crank end of the crank; with said first rocker arm and said second rocker arm upon the revolutionary motion of the crank cooperatively serving to limit the walking step of the leg to a reciprocating arcual motion as the knee joint is driven by said connecting arm; the improvement which comprises replacing at least one of said first rocker arm and said second rocker arm with an arcuate guide to limit the reciprocating arcual motion.

2. The improvement according to claim 1 wherein the walking device as a replacement for said first rocker arm includes an arcuate hip guide for guiding the hip joint therewith.

3. The improvement according to claim 1 wherein the walking device as a replacement for said second rocker arm includes an arcuate elbow guide for guiding the elbow joint connecting site therewith.

4. The improvement to the walking device according to claim 1 wherein the first rocker arm and the second rocker arm are replaced by an arcuate hip guide and an arcuate elbow guide respectively operationally engaged onto a hip axle slideably mounted thereto and an elbow axle slideably engaging therewith so as to thereby limit movement of the hip joint and the elbow joint connecting site to a reciprocating arcuate motion.

5. The walking device according to claim 1 wherein the device includes a plurality of legs operatively driven by a number of connecting arms operatively connected to an equal number of cranks.

6. The walking device according to claim 1 wherein the device includes at least a pair of laterally disposed legs axially connected to crank rods disposed at about a 180° differential relationship so as to permit one leg of the pair to be in an uplifted position while an opposite leg of the pair is positioned at a grounded stride position.

7. The walking device according to claim 1 wherein the walking device includes at least six paired legs paired together as a pair of legs disposed in a lateral relationship with each pair of said paired legs being driven by crank rods positioned at a 180° angular differential from one another so as to simulate upon movement the walking gait of said animal.

8. The walking device according to claim 7 wherein the paired legs are driven by connecting rods operationally connected to cranks powered by variable speed locomoting means for turning the cranks at different rotational speeds for each of said paired legs.

9. The walking device according to claim 8 wherein the paired legs include at least a pair of front legs and at least a pair of rear legs and the frame for said walking device further includes an articulated section between said front legs and said rear legs so as to permit articulation thereof when subjecting said walking device to a turning maneuver.

10. The device according to claim 1 wherein the walking device includes a plurality of legs and multiple cranks equipped with variable speed locomoting means for turning the cranks at different rotational speeds.

11. The device according to claim 10 wherein the walking device includes the plurality of legs interconnected to the cranks in such a manner so that a positioning of the foot end for each leg may be adjusted to a timed sequential setting, wherein at least three legs of the plurality will be in a grounded position at any given time.

12. The walking according to claim 1 wherein the walking device includes a chair for carrying an operating occupant for the device, variable speed electric motors as the locomoting means and a control box for operationally controlling the rotational speeds of the cranks.

* * * * *